(12) United States Patent
Anzelmo et al.

(10) Patent No.: US 12,365,784 B2
(45) Date of Patent: Jul. 22, 2025

(54) POLYMER MATRIX COMPOSITES, AND METHODS OF MAKING THE SAME

(71) Applicant: Lyten, Inc., San Jose, CA (US)

(72) Inventors: Bryce H. Anzelmo, Randolph, NJ (US); Hossein-Ali Ghezelbash, Oakland, CA (US)

(73) Assignee: Lyten, Inc., San Jose, CA (US)

( * ) Notice: Subject to any disclaimer, the term of this patent is extended or adjusted under 35 U.S.C. 154(b) by 0 days.

(21) Appl. No.: 18/959,240

(22) Filed: Nov. 25, 2024

(65) Prior Publication Data

US 2025/0092223 A1 Mar. 20, 2025

Related U.S. Application Data

(62) Division of application No. 18/115,643, filed on Feb. 28, 2023, now Pat. No. 12,195,605.

(60) Provisional application No. 63/318,213, filed on Mar. 9, 2022.

(51) Int. Cl.
*C08K 5/01* (2006.01)
*C01B 32/182* (2017.01)
*C01B 32/354* (2017.01)

(52) U.S. Cl.
CPC .............. *C08K 5/01* (2013.01); *C01B 32/182* (2017.08); *C01B 32/382* (2017.08)

(58) Field of Classification Search
CPC ........ C08K 5/01; C01B 32/182; C01B 32/382
See application file for complete search history.

(56) References Cited

U.S. PATENT DOCUMENTS

| 7,150,840 B2 | 12/2006 | Yamamoto et al. |
| 12,195,605 B2 | 1/2025 | Anzelmo et al. |
| 2006/0286361 A1 | 12/2006 | Yonetake |

(Continued)

FOREIGN PATENT DOCUMENTS

| CN | 1784516 A | 6/2006 |
| KR | 20160005578 A | 1/2016 |

OTHER PUBLICATIONS

Anzelmo et al., U.S. Appl. No. 18/115,643, filed Feb. 28, 2023.

(Continued)

*Primary Examiner* — Angela C Scott
(74) *Attorney, Agent, or Firm* — Paradice & Li LLP

(57) ABSTRACT

Carbon composites, including carbon fibers in a binder matrix, exhibit unique, advantageous mechanical properties, including inter laminar shear strength, compression strength, and resistance to forces applied at various angles. These improvements allow use of less material while conveying improved strength in myriad practical applications, reducing overall financial cost of fabrication, distribution, and practical utilization. These advantages are optimized via utilizing fabrication techniques that incorporate carbon filaments into carbon fibers, preferably incorporating carbon filaments and/or graphene platelets into said fibers, and incorporating the composite fibers, filaments, and/or graphene platelets into a binder matrix. The filaments and graphene platelets mechanically reinforce individual fibers, structures including multiple fibers strung together in a single cord, and the binder matrix, by "crosslinking" the individual fibers and/or fibers and binder matrix, e.g., with filaments and/or graphene ligands. The result includes materials exhibiting superior strength and reduced mass relative to conventional carbon fibers in a binder matrix.

23 Claims, 12 Drawing Sheets

(56) References Cited

U.S. PATENT DOCUMENTS

| | | |
|---|---|---|
| 2009/0224420 A1 | 9/2009 | Wilkinson |
| 2019/0345646 A1 | 11/2019 | Zhamu et al. |
| 2023/0287197 A1 | 9/2023 | Anzelmo et al. |

OTHER PUBLICATIONS

Gao et al., "Graphene reinforced carbon fibers," Science Advances, vol. 6, 2020, pp. 1-10.

Restriction Requirement from U.S. Appl. No. 18/115,643, dated Aug. 7, 2023.

International Search Report and Written Opinion from PCT Application No. PCT/US 23/14292, dated Jul. 27, 2023, 17 pages.

Wang et al., "Adsorption of Polycyclic Aromatic Hydrocarbons by Graphene and Graphene Oxide Nanosheets," Environmental Science and Technology, Mar. 2014, 10 pages, retrieved from https://www.researchgate.net/publication/261217937_Adsorption_of_Polycyclic_Aromatic_Hydrocarbons_by_Graphene_and_Graphene_Oxide_Nanosheets.

Rezvani-Eivari et al., "Magnetized graphene layers synthesized on the carbon nanofibers as novel adsorbent for the extraction of polycyclic aromatic hydrocarbons from environmental water samples," Journal of Chromatography A, vol. 1465, Sep. 2016, 29 pages.

Non-Final Office Action from U.S. Appl. No. 18/115,643, dated Dec. 7, 2023.

Non-Final Office Action from U.S. Appl. No. 18/115,643, dated Apr. 25, 2024.

Office Action from Taiwanese Application No. 112108718, dated Apr. 25, 2024, 11 pages.

Notice of Allowance from U.S. Appl. No. 18/115,643, dated Aug. 29, 2024.

Supplemental Notice of Allowance from U.S. Appl. No. 18/115,643, dated Dec. 11, 2024.

Anzelmo et al., U.S. Appl. No. 19/019,185, filed Jan. 13, 2025.

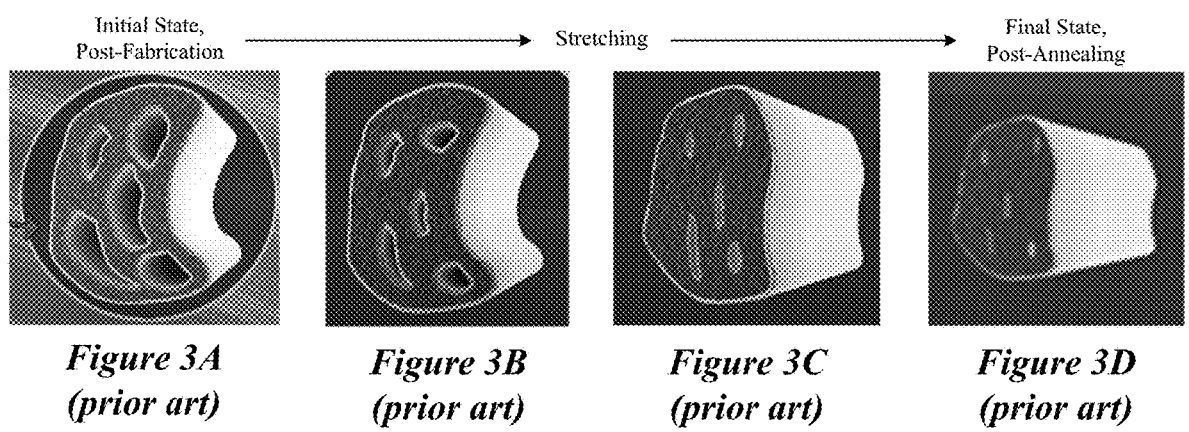
Figure 3A
*(prior art)*
Figure 3B
*(prior art)*
Figure 3C
*(prior art)*
Figure 3D
*(prior art)*
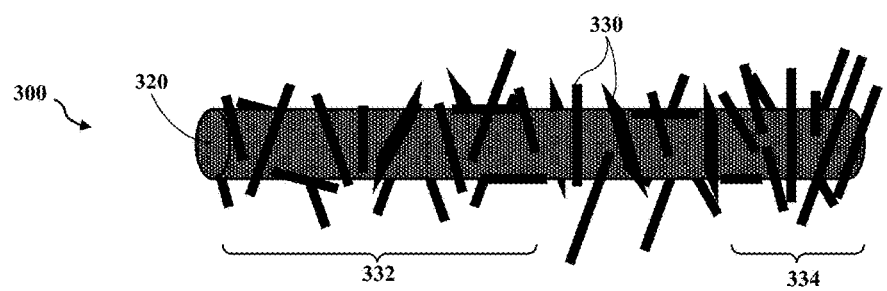
*Figure 3E*

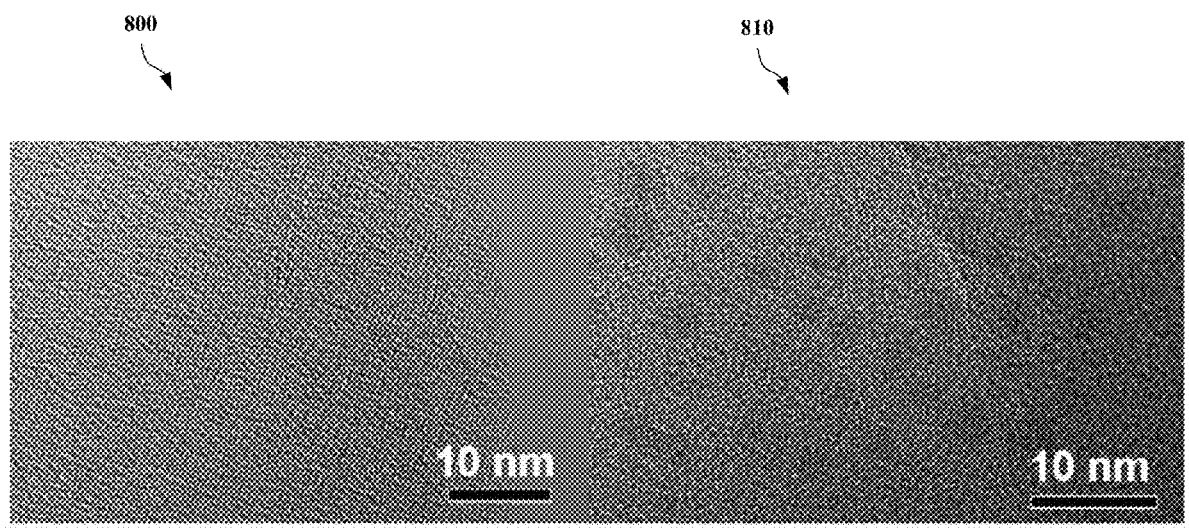
*Figure 8A*   *Figure 8B*

POLYMER MATRIX COMPOSITES, AND METHODS OF MAKING THE SAME

RELATED APPLICATIONS

The present application is a divisional of U.S. patent application Ser. No. 18/115,643, filed Feb. 28, 2023 and entitled "Polymer Matrix Composites, and Methods of Making the Same" (subsequently published as U.S. PG Pub No. US 2023/0287197 on Sep. 14, 2023), which claims priority to U.S. Provisional Patent Application No. 63/318,213, filed Mar. 9, 2022 and entitled "Graphene Reinforced Carbon Fibers," to each of which priority is claimed, and the contents of each of which are herein incorporated by reference in entirety.

FIELD OF THE INVENTION

The presently described inventive concepts relate to carbon composites with unique and advantageous mechanical properties, particularly carbon fiber compositions reinforced with graphene.

BACKGROUND

Ongoing efforts in the field of material synthesis seek continuing improvements in the quality and efficiency of fabricating various compositions of matter for myriad industrial, commercial, locomotive, and other applications. Of particular interest is the ability to fabricate stronger, lighter materials while concurrently reducing the cost of fabrication, both from a financial perspective and in terms of reducing amount of raw materials required to produce final products.

One promising candidate is carbon fiber. A carbon fiber is an engineered strain with hundreds or thousands of parallel filaments. Carbon fibers composed of anisotropic carbon are typically manufactured through a series of controlled thermal treatments of precursor polymer fibers. Multiple carbon fibers can be twisted into yarns, woven into fabrics, or mixed with other materials to produce a carbon fiber composite. Because carbon fibers have high tensile strength, low density, high modulus, and excellent creep and chemical resistance, carbon fiber composites have a high strength-weight ratio suitable for a wide variety of applications in aerospace, military, high-end electrical vehicles, mechanical parts, and civil engineering, among others.

However, simply shifting from using conventional polymers to using carbon fibers is insufficient to address challenges presented in the context of modern material fabrication. For instance, carbon fibers are known to suffer from poor compression strength, poor interlaminar shear strength, and tend to fall apart under relatively low forces applied at angles deviating substantially from parallel to the common longitudinal axis of the fiber, e.g., via tension applied at an angle perpendicular to the longitudinal axis of the fiber.

As such, there is thus a need for improving the mechanical strength of carbon fibers, as well as addressing other issues associated with the prior art.

SUMMARY

Polymer matrix composite compositions of matter, and methods of fabricating the same are disclosed. The compositions of matter generally comprise carbon fibers having carbon fiber filaments (which may include three-dimensional (3D) graphene) disposed within the bulk, on exterior surface(s), and/or structurally coupled to the carbon fibers. In the latter case, carbon fiber filaments may be present in an optional polymer matrix, which is at least partially in contact with surface(s) and/or interior voids of the carbon fiber. In all cases, inclusion of the carbon fiber filaments improves mechanical strength of the resulting material according to several important metrics including but not limited to compressive strength and interlaminar shear strength. In addition, particularly in implementations including 3D graphene, additional functionalization, surface modification, and tuning of properties of the composite material are enabled. Various aspects and advantages of utilizing the inventive concepts described herein will become clear upon a full review of the specification and drawings. The exemplary aspects presented immediately below are intended to be illustrative, and should not be considered limiting on the scope of the invention.

According to one aspect, a composition of matter includes a carbon fiber having a plurality of carbon fiber filaments disposed therein and/or disposed on surfaces of the carbon fiber, wherein at least some of the plurality of carbon fiber filaments are each independently characterized by a longitudinal axis oriented at an angle substantially deviating from parallel to a longitudinal axis of the carbon fiber.

According to another aspect, a composition of matter includes a carbon fiber having a plurality of graphene platelets disposed therein and/or disposed (e.g., sized) on surface(s) of the carbon fiber, wherein at least some of the graphene platelets comprise 3D graphene.

Optionally, the 3D graphene may be part of one or more carbon filaments disposed in or on the carbon fiber. Further still, at least some carbon atoms of the 3D graphene may be characterized by $sp^3$ orbital hybridization in some approaches. Preferably, the 3D graphene comprises a plurality of ligands integrated into: a bulk of the carbon fiber; an exterior surface of the carbon fiber; or both the bulk and the exterior surface of the carbon fiber. For example, carbon filaments and/or graphene platelets may be sized on surface(s) of the carbon fibers. With continuing reference to the graphene platelets, in some aspects the plurality of graphene platelets may each independently comprise each a single-layer graphene (SLG), a few-layer graphene (FLG), a multi-layer graphene (MLG), or any combination thereof. In further implementations, at least some of the graphene platelets may comprise one or more polycyclic aromatic hydrocarbons (PAHs) adsorbed to one or more adsorption sites on one or more surfaces of the graphene platelets.

In some aspects, longitudinal axes of at least some of the plurality of carbon fiber filaments are characterized by a substantially random distribution of orientation angles each independently deviating from parallel to the longitudinal axis of the carbon fiber. Moreover, longitudinal axes of other of the plurality of carbon fiber filaments may be aligned substantially in parallel with the longitudinal axis of the carbon fiber. Where the composition includes graphene platelets, planes of orientation of at least some of the graphene platelets may each independently be oriented at an angle substantially deviating from parallel to a longitudinal axis of the carbon fiber.

In more aspects, the carbon fiber filaments include either discontinuous filaments, continuous filaments, or both.

Preferably, some or all of the carbon fiber filaments are characterized by an aspect ratio in a range from about 100:1 to about 1000:1.

Advantageously, according to select implementations, the composition substantially excludes oxygen. Excluding oxygen may refer to exclusion of molecular oxygen (e.g., gas present in voids within the carbon fiber) or of atomic oxygen in the chemical composition of various components of the inventive compositions of matter.

Of course, certain implementations may include a plurality of carbon fibers. In such approaches, the plurality of the carbon fibers are preferably substantially aligned in parallel along the longitudinal axes thereof; and at least some of the carbon fiber filaments crosslink the plurality of carbon fibers, and/or at least some ligands of the 3D graphene crosslink the plurality of carbon fibers, lending additional mechanical strength to the composition of matter.

Thus, according to various aspects, it shall be understood that the presently disclosed inventive concepts include implementations in which carbon fiber filaments and/or graphene platelets (either or both of which may comprise three-dimensional graphene and any associated characteristics thereof as described herein) are present in the bulk volume of carbon fiber(s), sized onto external surface(s) of carbon fiber(s), present in a binder matrix and structurally coupled to the carbon fiber(s), or any permutation or combination of these structural arrangements. Furthermore, whether the composition of matter includes one or a plurality of carbon fibers, the composition of matter may optionally include a polymer matrix or other suitable binder matrix which itself may have carbon fiber filaments and/or graphene platelets disposed therein. Furthermore, these filaments and/or platelets are structurally coupled to some or all of the carbon fibers, lending even further mechanical strength and other improvements to the composite material.

For instance, in one approach a composition of matter includes a carbon fiber having a plurality of carbon fiber filaments sized on one or more external surfaces thereof, wherein the carbon fiber filaments are characterized by either: comprising graphene platelets; having a longitudinal axis of some or all of the carbon fiber filaments oriented at an angle substantially deviating from parallel to a longitudinal axis of the carbon fiber; or both comprising the graphene platelets and having the longitudinal axis of some or all of the carbon fiber filaments oriented at the angle substantially deviating from parallel to the longitudinal axis of the carbon fiber. The carbon fiber may additionally or alternatively include (or exclude) any of the foregoing features, limitations, structural arrangements, etc. in any permutation or combination without departing from the scope of the presently disclosed inventive concepts.

In another exemplary approach, a composition of matter includes a carbon fiber; and a binder matrix, wherein the binder matrix is structurally coupled to the carbon fiber via either: a plurality of carbon fiber filaments in the binder matrix; a plurality of graphene platelets in the binder matrix; or both the plurality of carbon fiber filaments in the binder matrix and the plurality of graphene platelets in the binder matrix. The carbon fiber may additionally or alternatively include (or exclude) any of the foregoing features, limitations, structural arrangements, etc. in any permutation or combination without departing from the scope of the presently disclosed inventive concepts.

Turning now to methods of fabrication, according to one aspect, a method of fabricating a carbon fiber filament includes: receiving a spinning dope containing a plurality of polymer particles in a liquid form and a plurality of graphene platelets; extruding the spinning dope through one or more openings, and solidifying the extruded spinning dope into one or more polymer filaments.

According to another aspect, a method of fabricating a carbon fiber filament includes: exposing the extruded spinning dope to a plurality of graphene platelets. It should be noted that this method, in select approaches, may be performed concurrently with solidifying the extruded spinning dope into one or more polymer filaments, or after doing so.

According to yet another aspect, a method of fabricating a carbon fiber filament includes: oxidizing the one or more polymer filaments at a first temperature; carbonizing the one or more polymer filaments at a second temperature; and graphitizing the one or more polymer filaments at a third temperature. In various implementations, this method may be performed independently, or after solidifying the extruded spinning dope into one or more polymer filaments.

According to still yet another aspect, a method of fabricating a carbon fiber filament includes: applying a sizing layer containing a plurality of graphene platelets onto a carbon fiber filament.

Again, the foregoing exemplary aspects and implementations are presented by way of illustration rather than limitation. Additional features and advantages of the presently described inventive concepts are disclosed in the following detailed description and shown in the various drawings.

BRIEF DESCRIPTION OF THE DRAWINGS

FIG. 3A is an image depicting a conventional carbon fiber in its initial state post-fabrication, including a plurality of voids.

FIGS. 3B and 3C are images depicting a conventional carbon fiber after stretching, and still including the plurality of voids.

FIG. 3D is an image depicting a conventional carbon fiber in its final state after annealing, and still yet including the plurality of voids.

FIG. 3E is a simplified schematic of an exemplary carbon fiber having a plurality of carbon fiber filaments and/or platelets disposed therein, according to some implementations.

FIG. 8A is a micrograph image showing a conventional carbon fiber without carbon fiber filaments or particles disposed therein, from a cross-sectional view according to one approach.

FIG. 8B is a micrograph image showing an inventive carbon fiber having a plurality of carbon fiber filaments or particles disposed therein, from a cross-sectional view according to another approach.

Like reference numbers and designations in the various drawings indicate like elements.

DETAILED DESCRIPTION

Figure 1A:
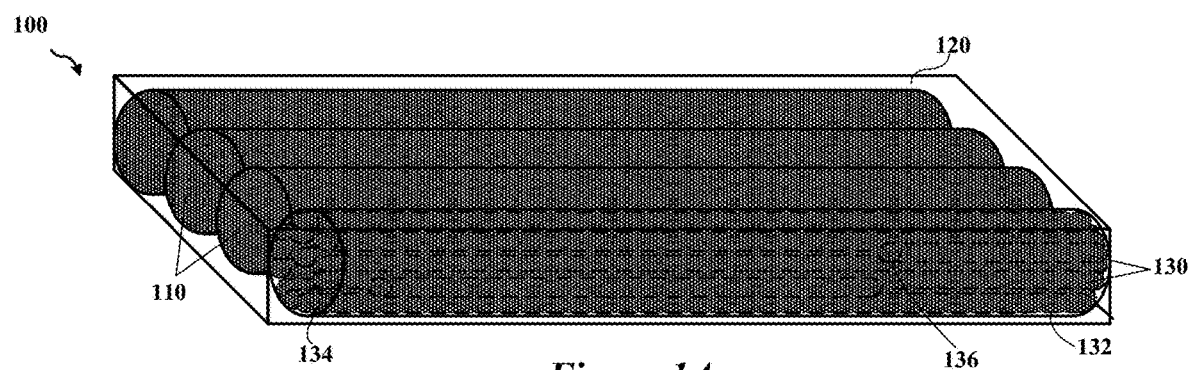
FIG. 1A shows a simplified schematic of an exemplary carbon fiber composite, according to one implementation.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Carbon fibers (CFs) are commonly used as a type of reinforcing material in composites for lightweight composite applications. Even though carbon fibers have certain desirable mechanical properties for some high-end applications, CFs generally have low compression strength. Additionally, the use of carbon fiber composite in other areas is limited because of high manufacturing costs. Currently commercially available carbon fibers are predominately manufactured using an expensive precursor material, such as polyacrylonitrile (PAN), which counts for more than 50% of the manufacturing cost of PAN-based CFs. Moreover, the time and energy-consuming manufacturing process of PAN-based CFs further increases the manufacturing costs. Low-cost precursor material such as pitch, rayon and other polymers have been utilized to produce CFs. However, the mechanical properties of CFs derived from these low-cost precursors are inadequate to be used in many applications, including as a reinforcing material.

Implementations of the subject matter described in this disclosure may be used for manufacturing a carbon fiber from lower-cost precursors having mechanical properties that are the same or superior to the more expensive PAN-based carbon fibers. The implementations of the subject matter described in this disclosure may also be used for reducing the time and energy associated with manufacturing PAN-based carbon fibers, thereby lowering the manufacturing cost of such carbon fibers. A carbon fiber may consist of hundreds or thousands of carbon fiber filaments. The carbon fiber filaments are produced by polymer filaments, which become carbon fiber filaments after oxidization, carbonization, and graphitization. In some implementations, the polymer filaments may be produced via wet spinning, electrospinning, or melt spinning. In some aspects, a plurality of graphene platelets may be added in the spinning process of the polymer filaments to minimize internal voids or defects in the microstructure of the polymer filaments.

Adding graphene platelets into the spinning process may also allow increased graphitic microstructure in the resulting carbon fiber filaments. In some other aspects, the plurality of graphene platelets may be added to the carbon fiber filaments as a coating or a sizing to improve adhesion between the carbon fiber filaments and the surrounding binder matrix. As utilized herein, the term "sizing" shall be understood as referring to any process of covering or coating a fiber or equivalent filamentous structure, in whole or in part, where the covering or coating enhances or detriments one or more existing properties or features of the fiber (or fiber equivalent), conveys one or more new properties or features on the fiber (or fiber equivalent), eliminates one or more existing properties or features of the fiber (or fiber equivalent), or any combination thereof that would be appreciated by a person having ordinary skill in the art upon reading the present disclosure.

The carbon fiber filaments may be produced by techniques described herein, or may be obtained from a commercial manufacturer. In some instances, the plurality of graphene platelets may be surface modified to have one side polar and the opposite side nonpolar. For example, polycyclic aromatic hydrocarbons (PAHs) may be adsorbed at one or more adsorption sites on a first side of the graphene platelet to increase the polarity of the first side of the graphene platelet relative to the second side of the platelet.

Particular implementations of the subject matter described in this disclosure can be implemented to realize one or more of the following potential advantages. Existing PAN-based carbon fibers may not be suitable for many cost-sensitive applications, such as an electric vehicle with a high fuel efficiency for an average consumer. In some implementations, the techniques disclosed herein can be used to manufacture a plurality of carbon fiber filaments from low-cost precursors having mechanical properties the same or superior to those of PAN-based carbon fibers. Such mechanical properties include (but are not limited to) tensile strength, tensile modulus, and compression strength in the direction parallel to the carbon fiber axis, tensile strength, tensile modulus, and compression strength in the direction orthogonal to the carbon fiber axis, in-plain shear strength and modulus, interlaminar shear strength, and flexural strength and modulus. In this way, carbon fibers and carbon fiber composites produced using techniques described herein may have desirable mechanical properties at a market price deemed more affordable by an average consumer.

FIG. 1A shows an example carbon fiber composite 100 in accordance with one or more implementations of the subject matter disclosed therein. The carbon fiber composite 100 is shown to include four carbon fibers 110 in parallel to one another, and an optional binder matrix 120. The binder matrix 130 may hold or adhere the carbon fibers 110 and increase their rigidity. In some implementations, the carbon fiber composite 100 may contain less than or more than four carbon fibers 110. In some implementations, the one or more carbon fibers 110 can be arranged in a vertical direction before they are mixed with the binder matrix 120. In some other implementations, the one or more carbon fibers 110 may be woven into a fabric, may be arranged in a pile, or may be pre-oriented in any other arrangements before mixed with the binder matrix 120. The binder matrix 120 may be a resin or any other suitable materials that may adhere two physical surfaces. For example, the binder matrix 120 may include thermosetting and thermoplastic polymers, metal, ceramic compounds, or any combination thereof. Because the binder matrix 120 may be a resin matrix, the carbon fiber composite 100 is a carbon fiber reinforced polymer (CFRP) when the one or more carbon fibers 110 are mixed with the resin matrix. In some implementations, the resin matrix may include epoxy resin, polyester resin, vinyl ester resin, nylon resin, or any combination thereof.

For the example of FIG. 1A, each of the carbon fibers 110 includes a plurality of carbon fiber filaments 130. The carbon fiber filament 130 may include an external body 132, a cross-section surface 134, and a plurality of graphene platelets (not shown in FIG. 1A for simplicity) containing layers of graphene. In some aspects, each of the graphene platelets may contain a single-layer graphene (SLG), a few-layer graphene (FLG), a multi-layer graphene (MLG), or any combination thereof. In some implementations, the cross-section surface 134 may have various shapes. For example, the cross-section surface 134 may have a regular shape such as a circle, a rectangle, or a triangle. For other examples, the cross-section surface 134 may have an irregular shape such as a kidney-like shape. In some implementations, the plurality of carbon fiber filaments 130 may be oriented in parallel to one another along the length of the carbon fibers 110. In some other implementations, the plurality of carbon fiber filaments 130 may be oriented differently with respect to each other within the carbon fiber 110.

For example, as shown and discussed in greater detail below with reference to FIG. 3E, some or all of the carbon fiber filaments 130 may each independently have a longitudinal axis that is oriented at an angle deviating from parallel to the longitudinal axis of the respective carbon fiber 110 in which it is disposed. In some approaches, the carbon fiber filaments 330 may collectively be characterized by the fact that the longitudinal axes thereof exhibit a substantially random, or normal, distribution with respect to the angle of orientation of the carbon fiber filaments 130 relative to the orientation of the longitudinal axis of the carbon fiber 110 in which the filaments 130 are disposed. In still more approaches, some of the carbon fiber filaments 130 may be oriented substantially in parallel with the longitudinal axis of the carbon fiber 110 in which they are disposed, while other of the carbon fiber filaments 130 may have a longitudinal axis that is oriented at an angle deviating from parallel to the longitudinal axis of the respective carbon fiber 110 in which it is disposed.

In preferred approaches, at least about 5% of the carbon fiber filaments 130 are characterized by each independently have a longitudinal axis that is oriented at an angle deviating from parallel to the longitudinal axis of the respective carbon fiber 110 in which the carbon fiber filament 130 is disposed. For example, according to various implementations, at least about 5%, at least about 10%, at least about 20%, at least about 25%, at least about 33%, at least about 40%, at least about 50%, at least about 60%, at least about 66%, at least about 75%, at least about 80%, at least about 90%, at least about 95%, at least about 97%, at least about 98%, at least about 99%, about 99% or more, or even 100% of the carbon fiber filaments 130 disposed in the carbon fiber 110 are characterized by each independently have a longitudinal axis that is oriented at an angle deviating from parallel to the longitudinal axis of the respective carbon fiber 110. In preferred approaches, the proportion of carbon fiber filaments 130 having an angle of orientation substantially deviating from parallel to the longitudinal axis of the carbon fiber 110 is in a range from about 0.01% to about 47%.

As referenced herein, an angle of orientation is considered "deviating" or "substantially deviating" from parallel to a given reference point or feature (e.g., an axis, preferably a longitudinal axis, of a filamentous or elongated structure, most preferably a longitudinal axis of a carbon fiber) when the angle of orientation deviates from parallel by an amount of at least 30 degrees, an amount of at least 45 degrees, an amount of at least 60 degrees, an amount of at least 75 degrees, or an amount of 90 degrees (i.e., perpendicular or orthogonal), according to various embodiments.

Those having ordinary skill in the art will further appreciate that different implementations of the inventive concepts herein may include substantially uniform reinforcement of the entire volume and/or surface(s) of fibers, or non-uniform reinforcement thereof. For example, it may be advantageous to selectively reinforce only portions of the fiber that are known or expected to experience mechanical failure under a given stress. In other embodiments, it may be desirable to omit reinforcing certain portions of the fiber in order to include intended failure points that are likely to experience mechanical failure under a given stress. These and other equivalent engineering considerations may be implemented in any suitable manner without departing from the scope of the presently disclosed inventive concepts.

In some instances, the carbon fiber filament 130 may be a continuous fiber with a length that is identical to the length of the carbon fiber 110. In some other instances, the carbon fiber filaments 130 may be discontinuous, and have a length that is shorter than the length of the carbon fiber 110 due to one or more breakages 136. For instance, in various approaches, carbon fiber filaments 130 may be characterized by an aspect ratio in a range from about 100:1 to about 1000:1. For instance, and without limitation, the carbon fiber filaments may have an aspect ratio of about 100:1, about 150:1, about 250:1, about 400:1, about 500:1, about 666:1, about 750:1, about 800:1, about 900:1, about 950:1, about 975:1, about 990:1, about 999:1, or about 1000:1, according to various implementations. As will be appreciated by those having ordinary skill in the art upon reading the present disclosure, preferred embodiments of inventive carbon composite materials described herein include at least some discontinuous fibers having small diameters, and a total amount of fiber present is preferably lower than conventional carbon fibers. For instance, the total amount of fiber is preferably in a range from about 50 wt % to about 75 wt % with respect to the overall amount of material. The total amount of fiber may thus be about 50 wt %, about 60 wt %, about 66 wt %, about 70 wt %, about 75 wt %, etc., according to various implementations. Reducing the amount of fiber present advantageously reduces impact and cost of fabrication, distribution, and utilization of the inventive materials and corresponding products produced therewith. This is possible due to the improved mechanical strength of the inventive carbon composite materials described herein.

In various implementations, the plurality of carbon fiber filaments 130 may be manufactured from a plurality of polymer filaments fabricated by a spinning process, such as wet spinning, electrospinning, or melt spinning, and subsequently treated with stabilization, physical stretch, oxidation, carbonization, graphitization, and any other suitable physical or chemical processes. In some implementations, the plurality of polymer filaments may be physically bundled into fibers before carbonization. In some other implementations, the plurality of polymer filaments may be used to produce the plurality of carbon fiber filament 130, and then physically bundled into the one or more carbon fibers 110.

Figure 1B:
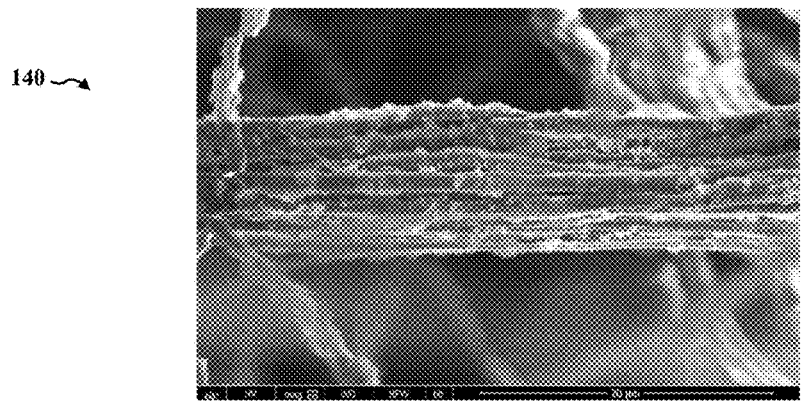
FIG. 1B is a scanning electron micrograph (SEM) image of a spun carbon-based fiber such as shown in FIG. 1A, according to one implementation.

FIG. 1B is a SEM image 140 of a spun carbon-based composite, according to one exemplary implementation. As can be seen from FIG. 1B, the composite is an elongated structure comprising a plurality of carbon fibers substantially oriented in parallel along the respective longitudinal axes thereof. A careful review of FIG. 1B will reveal presence of carbon fiber filaments, which preferably include graphene platelets in turn comprising 3D graphene, disposed along outer surface(s) of the individual carbon fibers. Though not visible in FIG. 1B (but as shown, inter alia in FIGS. 7A-7C and 8B), the carbon fiber filaments are preferably integrated into the carbon fibers, as well as present in interstitial spaces between the individual carbon fibers, thus conveying improved mechanical strength and/or additional properties such as thermal or electrical conductivity along particular orientation, such as through or perpendicular to the longitudinal axis of the filament, fiber, composite, etc. as would be understood by a person having ordinary skill in the art upon reading the present disclosure. Improved thermal conductivity, in some aspects, may improve oxidation of precursor materials including 3D graphene, further improving the resulting composite material. Further still, including 3D graphene in precursor materials used to fabricate the presently described compositions of matter allows increased tension during spin-based fabrication methods, which in turn allows for smaller diameter fibers/filaments and better control over the microstructure and macrostructure of the resulting fibers/filaments. In addition, including 3D graphene in precursor materials may improve rheological properties of the pre-spun chemistries.

Figure 2:
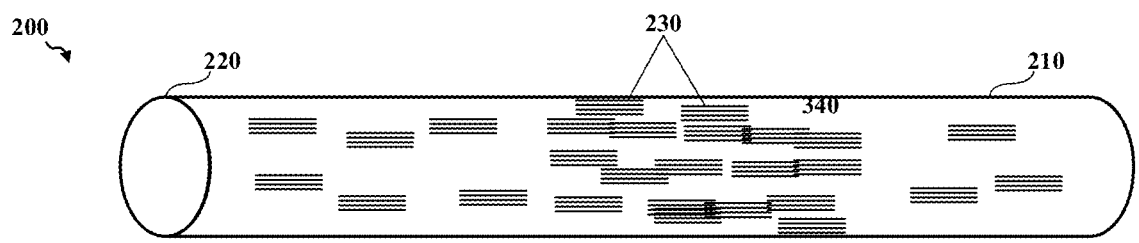
FIG. 2 shows a simplified schematic of an illustrative polymer filament, according to some implementations.

FIG. 2 shows an example polymer filament 200 that may be used to manufacture the carbon fiber filament 130 of FIG. 1A, according to some implementations. The polymer filament 200 is shown to include a longitudinal body 210, a cross-section surface 220, and a plurality of graphene platelets 230 within the longitudinal body 210. In some implementations, the plurality of graphene platelets 230 may be dispersed within the longitudinal body 210 at various concentrations. In some implementations, each of the graphene platelets 230 may contain a single-layer graphene (SLG), a few-layer graphene (FLG), a multi-layer graphene (MLG), or any combination thereof. In various implementations, the plurality of graphene platelets 230 may be modified via chemical techniques to have one side of the graphene platelet 230 polar and the opposite site of the graphene platelet 230 nonpolar (polarity not shown in FIG. 2 for simplicity). For example, the chemical techniques may include functionalization with chemical functional groups, adsorption with chemical compounds, or a combination thereof. In some instances, the chemical compounds that are adsorbed on the surface of the graphene platelet 230 may include polycyclic aromatic hydrocarbons (PAHs) (not shown in FIG. 2 for simplicity).

In some implementations, the polymer filament 200 may be fabricated using a spinning process of a spinning dope. The spinning process may be wet spinning, electrospinning, melt spinning, or any combination thereof. In some other implementations, the polymer filament 200 may be fabricated using other suitable chemical processing techniques. The spinning dope may have a plurality of polymer particles in a liquid form. The plurality of polymer particles may contain synthetic, semisynthetic, or non-synthetic polymers. For example, the plurality of polymer particles may be or contain PAN, pitch, rayon, or any combination thereof. In some instances, the plurality of graphene platelets 230 may be added to prepare the spinning dope. In some other instances, the plurality of graphene platelets 230 may be added when solidifying the spinning dope after being extruded. In various implementations, the weight percentage of the plurality of graphene platelets being added may be less than 1 wt %. Upon extrusion through one or more openings in a spinning process, the flow of the spinning dope may induce the plurality of graphene platelets 230 to be aligned in parallel with one another and oriented with the longest side along the length of the longitudinal body 210 and with graphene layers stacking in a direction perpendicular to the length of the longitudinal body 210.

In this way, the plurality of graphene platelets 230 may serve as a structure-directing template to guide molecular chain alignment in a polymer. The plurality of graphene platelets 230 may also function as nucleating agents to increase polymer coagulation during the solidification process, thereby minimizing the size of voids or defects inside the fabricated polymer filament 200. When the polymer filament 200 undergoes oxidation, carbonization, and graphitization to form the carbon fiber filament 130 of FIG. 1A, the enhanced alignment of the molecular chains in the polymers translates into increased graphitic microstructure of the carbon fiber filament 130. Additionally, because of the dangling bonds on the graphene edge of the graphene platelet 230, the plurality of graphene platelets 230 may form bonds with the polymers within the polymer filament 200 to provide starting points (or catalytic seeds) to facilitate formation of the graphitic microstructure while consuming less thermal energy during the graphitization step. The elimination of internal porosity and increased graphite microstructure may enhance the effective load-bearing cross section in the carbon fiber 110 of FIG. 1A, and thereby enhance tensile strength of the carbon fiber 110 in the direction orthogonal to carbon fiber axis (90-degree tensile strength). See Table 1 below for exemplary figures of merit according to various measures of strength and one exemplary embodiment of the presently disclosed inventive concepts.

For context and comparison, FIGS. 3A-3D depict a conventional carbon fiber from a cross-sectional view at various stages of fabrication and post-processing. It is immediately apparent that conventional carbon fibers include a plurality of voids extending along the interior thereof, and typically oriented substantially parallel to the longitudinal axis thereof. As shown in FIG. 3A, such voids are present immediately post-fabrication, when the fiber is in an "initial state". In order to reduce the volume of these voids, which those having ordinary skill in the art will appreciate convey corresponding mechanical weakness (particularly weakness to compression and/or tension in a direction substantially deviating from parallel to the longitudinal axis of the fiber) on the fiber, fabrication may be followed by post-processing steps such as stretching the fiber (optionally under elevated temperature), and/or annealing the fiber. As shown in FIGS. 3B, 3C, and 3D, these procedures can reduce, but do not eliminate, the void volumes in the final, conventional carbon fiber product.

Accordingly, to further reduce the negative consequences associated with retaining voids in the conventional carbon fiber, a filler material may be included in the carbon fiber. However, as known in the art, attempts to rectify the problems caused by voids are complicated and often fail due to dissimilar chemistry with respect to the filler material composition and the carbon fiber (or precursors thereof). Thus, using filler to address mechanical weakness in conventional carbon fibers is an unsatisfactory solution.

For example, fillers employing conventional graphene-based materials (i.e., graphene materials mined from graphite) require chemicals and/or mechanical methods to break down the material in a suitable fashion. This process leaves the 'graphene' with significant defects (e.g., basal plane holes, other lattice defects, etching chemistry left behind in the process, etc.) meaning conventional graphene is typically weaker than fiber and/or polymer leading to minimal increases, if any, in mechanical strength improvements. Other materials, such as quartz, silicas, talc powder, etc. have the limitation of brittleness and/or inferior innate properties thus adding minimal value to the composite material. For instance, conventional mica is characterized by a Young's modulus on the order of about 5.4 GPa, silica has a Young's modulus less than 100 GPa, and talc powder has a Young's modulus on the order of less than about 50 GPa. These types of materials typically detract from the overall system by introducing additional void content and/or inclusions within and/or around the fiber/polymer interface or throughout the polymer.

Moreover, conventional materials typically include an undesirably high amount of water content. For example, muscovite is typically about 5 wt % water content, and other inorganic materials often include water in an amount ranging from greater than 1 wt % to about 2 wt %.

The inventive precursor materials utilized herein, by contrast, have 1.5 wt % or less water content, e.g., about 1.5 wt % or less, about 1.0 wt % or less, etc. as would be understood by a person having ordinary skill in the art upon reading the present disclosure. In the final composite, water may be present in an amount less than 0.5 wt %, e.g., about 0 wt %, greater than 0 wt % but less than about 0.1 wt %, greater than 0 wt % but less than about 0.25 wt %, greater than 0 wt % but less than about 0.33 wt %, greater than 0 wt % but less than about 0.5 wt %, etc. as would be understood by a person having ordinary skill in the art upon reading the present disclosure.

In addition, the size of the filler material particles becomes increasing important relative to the fiber diameter. For instance, when filler material size becomes approximately five times (or more) larger than the fiber material (e.g., as is the case for mica flakes having millimeter scale particle size, with corresponding fiber size in the 5-30 micrometer scale) this imbalance can undesirably yield decreased bonding sites between fiber/polymer.

Dispersion throughout precursor materials is also a challenge for conventional filler. While functionalization might allow for these materials to be dispersible, the resulting filler still fails to improve the final system strength due to the aforementioned issues/challenges.

Further considerations for conventional filler materials include viscosity, such as ion viscosity, dynamic viscosity, status viscosity, curing viscosity, or similar metrics, which has to be carefully managed through the fabrication of conventional materials using carbon fiber.

Further still, the 'cure index' measured at the end of conventional carbon fiber systems typically indicates less then desirable cures, i.e., less than about 100% cure. This is due to the conventional materials interfering with the cross-linking of the two-part system, for thermosetting systems, and/or impeding the flow of a polymer to mix/melt around a fiber, leading to decreased wetting of the fiber with the filler material.

Increased oxygen from the functionalization and/or introduced from the particle (typically in the form of free oxygen within the pores and/or due to increased surface area of the particle) have a negative effect on the overall system through 1) decreased curing kinetics; 2) decreased cure rate; 3) undesirable viscosity increase/decrease; 4) and adverse modification of the embedded chemistries within the polymer (e.g., antioxidant depletion or) any combination of or a secondary effect leading back to one of the foregoing. It should be noted that the impurities of some of these materials could further minimize their usefulness and potential purpose of their use.

For instance, exemplary conventional filler materials that have been found to be undesirable for use with carbon fibers include other graphenes, carbon allotropes, CNTs, carbon black, silica, Muscovite, quartz, silicates, and other organic/inorganics. These materials exhibit properties such as inappropriately large or small aspect ratios, including an undesirably high amount of molecular oxygen, having a surface chemistry that creates adverse results upon attempting to functionalize the surface, or having a mechanical strength (e.g., as may be measured according to any metric described herein and equivalents thereof that would be understood by a person having ordinary skill in the art upon reviewing the present disclosure) that is lower than a mechanical strength of the fiber(s) to be repaired or reinforced, or any combination thereof.

By contrast, the presently disclosed inventive concepts approach problems with mechanical weakness by directly integrating supportive material (e.g., carbon filaments, 3D graphene, etc. as described herein) with the carbon fiber (and/or precursors thereof) that has compatible chemistry, particularly surface chemistry, due to the similar nature of the compounds used (e.g., pitch, PAN, rayon, etc. as described herein and according to various approaches).

For instance, carbon fibers are generally hydrophobic, while polymers used in conjunction therewith are hydrophilic. The carbon filaments, and particularly 3D graphene described in accordance with the inventive concepts presented herein bridge this gap and allow substantial improvement with respect to mechanical strength of the resulting fibers. Additionally, the 3D graphene materials can be engineered to have different surface chemistries, e.g., hydrophilicity tuning leading to hydrophobic and hydrophilic surfaces within the same 3D graphene structure. This type of engineering allows for the 3D graphene to bridge, e.g., via interfacial bonding, between the carbon fiber(layer1)-polymer matrix-carbon fiber(layer 2)-et al. constructure. 3D graphene also advantageously acts as a catalyst for pyrolysis, particularly of pitch, further facilitating fabrication of stronger materials Additionally, the utilization of pitch for fibers has been limited by the inferior resultant mechanical properties of a fiber produced with pitch, however, with the additional of 3D graphene to enhance said fiber, pitch having equal/superior properties to other carbon fibers, e.g., those derived from PAN are considered an advantageous aspect of the presently disclosed inventive concepts.

Moreover, the ability to tune and control the orientation of carbon filaments that are disposed within carbon fibers conveys substantial improvement to compression strength and tension applied at angles deviating from substantially parallel to the longitudinal axis of the carbon fiber. Of course, other improvements such as modulus strength, in-plane shear strength, interlaminar shear strength, flexural strength, etc. as described herein are also realized via implementing the inventive materials and techniques described herein.

Further, the ability to disperse carbon filaments and 3D graphene throughout the composition allows for additional anchor points, and improved fiber/polymer interaction compared to conventional carbon fiber formulations and methods of fabrication.

Referring now to FIG. 3E, an example carbon fiber filament 300, according to some implementations of the presently disclosed inventive concepts, is shown according to a simplified schematic highlighting the orientation of carbon fiber filaments. The carbon fiber filament 300, which may be one example of the carbon fiber filament 130 of FIG. 1A, may have a plurality of graphene platelets sized (or coated) on the external surface of the carbon fiber filament 300. In some instances, the carbon fiber filament 300 may be produced by techniques and processes disclosed herein such as wet spinning, electrospinning, melt spinning, hybrid methods, e.g., dry jet/wet spinning, or any suitable combination or equivalent(s) thereof, as would be appreciated by those having ordinary skill in the art upon reading the present disclosure. In other instances, the carbon fiber may be a commercially available product.

For the example of FIG. 3E, the carbon fiber filament 300 is shown to include an external surface 320 and a plurality of graphene platelets 330 sized on the external surface 320. In some implementations, each of the graphene platelets 330 may contain a single-layer graphene (SLG), a few-layer graphene (FLG), a multi-layer graphene (MLG), or any combination thereof. In various implementations, each of the graphene platelets 330 may be modified via chemical techniques to have one side of the graphene platelet 330 polar and the opposite site of the graphene platelet 330 nonpolar. For example, the chemical techniques may include functionalization with chemical functional groups, adsorption with chemical compounds, or a combination thereof. In some instances, the chemical compounds that are adsorbed on the surface of the graphene platelet 330 may include PAH adsorbed at one or more adsorption sites on a first side of the graphene platelet 330 (not shown in FIG. 3E for simplicity).

According to various applications, graphene platelets or other forms of 3D graphene may be present in a range from less than 1 wt % to about 100 wt % of the fiber. For instance, the 3D graphene or graphene platelets may be present in an amount less than about 1 wt %, an amount of about 1 wt %, about 2 wt %, about 5 wt %, about 10 wt %, about 15 wt %, about 20 wt %, about 25 wt %, about 30 wt %, about 33 wt %, about 40 wt %, about 50 wt %, about 60 wt %, about 66 wt %, about 70 wt %, about 75 wt %, about 80 wt %, about 90 wt %, about 95 wt %, about 98 wt %, about 99 wt %, about 99.9 wt %, or any range including these values and/or values therebetween.

In some implementations, 3D and/or graphene platelets may be present (e.g., via sizing) on external surface(s) of the fiber in an amount ranging from less than 1 wt % to about 20 wt %. For instance, the amount of 3D graphene and/or graphene platelets sized on the external surface(s) of the fiber may be less than about 1 wt %, about 1 wt %, about 2 wt %, about 5 wt %, about 7.5 wt %, about 10 wt %, about 12.5 wt %, about 15 wt %, about 17.5 wt %, about 20 wt % or any range including these values and/or values therebetween, In one particularly preferred embodiment, the weight percentage of the plurality of graphene platelets being sized on the external surface 320 may be less than 1 wt % of the total weight of the fiber.

In other implementations, graphene and/or 3D graphene precursor materials may comprise from less than 1 wt % to about 100 wt % of the fiber. For instance, the 3D graphene or graphene platelets may be present in an amount less than about 1 wt %, an amount of about 1 wt %, about 2 wt %, about 5 wt %, about 10 wt %, about 15 wt %, about 20 wt %, about 25 wt %, about 30 wt %, about 33 wt %, about 40 wt %, about 50 wt %, about 60 wt %, about 66 wt %, about 70 wt %, about 75 wt %, about 80 wt %, about 90 wt %, about 95 wt %, about 98 wt %, about 99 wt %, about 99.9 wt %, or any range including these values and/or values therebetween.

As shown in FIG. 3E, the plurality of graphene platelets 330 may have various lengths and may be sized on the external surface 320 at various concentrations. As an example, a first region 334 may have the plurality of graphene platelets 330 located closer to one another compared to the plurality of graphene platelets in a second region 332, and therefore the first region 334 has a higher concentration of graphene platelets 330 than the second region 332. In some implementations, the plurality of graphene platelets 330 may be sized on the external surface 320 at various angles between 0 degrees and 90 degrees with respect to the fiber axis. However, it shall be appreciated that in accordance with various embodiments of the presently described inventive concepts, fibers may be reinforced, e.g., by filamentous carbon-based structures as described herein, via such reinforcing structures being present within the bulk volume of the fiber, sized (or otherwise disposed) on surface(s) of the fiber, or in close proximity to the fiber, e.g. via being present in a resin or binder matrix structurally coupled to the fiber.

Accordingly, the plurality of graphene platelets 330 may prevent adhesive failure that generally happens in an interphase between the carbon fiber filament 300 and the surrounding polymer in the binder matrix 120 of FIG. 1A. In various implementations, the plurality of graphene platelets 330 may serve as anchor points bridging the plurality of carbon fiber filaments 300 and the binder matrix. For example, when a stress associated with a load is applied to the carbon fiber composite 100 of FIG. 1A in a direction vertical to the fiber axis, the polar side of the graphene platelet 330 may interact well with the hydrophilic binder matrix and the nonpolar side of the graphene platelet 330 may remain strongly bonded to the carbon fiber filament 300 to secure a "crosslinking" between the carbon fiber filament 300 and the binder matrix. In this way, the "crosslinking" prevents the carbon fiber filament 300 from being separated from a carbon fiber composite, thereby improving mechanical strength of the carbon fiber composite.

Again, while the illustrative implementation depicted in FIG. 3E is described hereinabove as having a plurality of graphene platelets 330 "sized" on the external surface 320 thereof, it shall be understood that in various approaches, carbon fiber filaments and/or graphene platelets may additionally or alternatively be integrated into, or intermeshed throughout, the interior volume of a given carbon fiber, and/or throughout interstitial spaces between carbon fibers, as shown and described in greater detail hereinbelow with respect to FIGS. 7A-7C and 8B.

Figure 4:
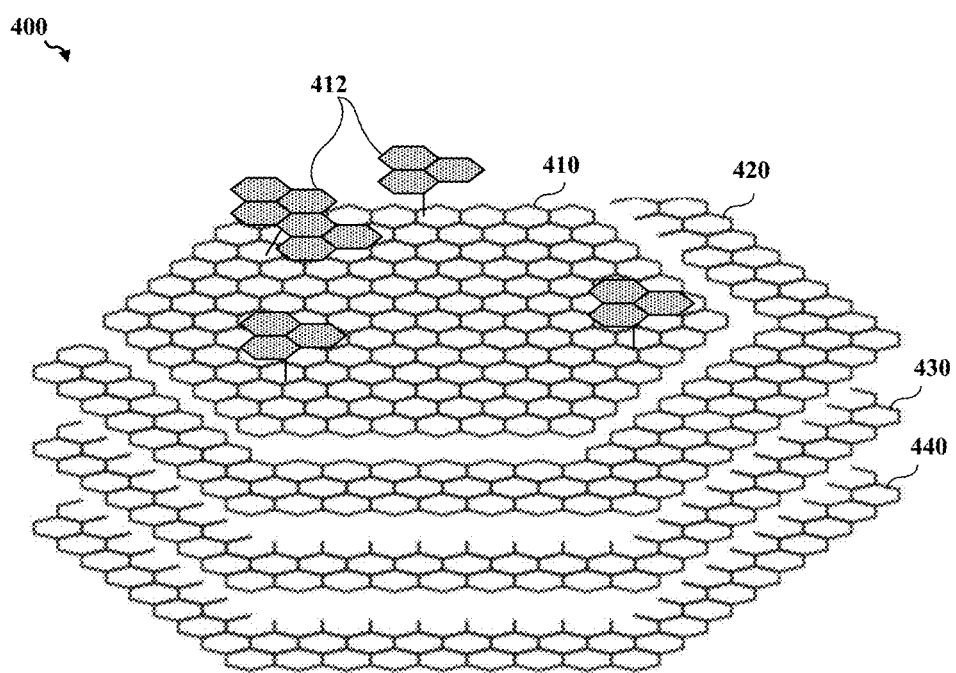
FIG. 4 shows a simplified schematic of an exemplary three-dimensional (3D) graphene platelet that may be used to manufacture the polymer filament of FIG. 2 or the carbon fiber filament of FIG. 3E, according to some implementations.

FIG. 4 shows an example graphene platelet 400 that may be used to manufacture the polymer filament of FIG. 2 or the carbon fiber filament of FIG. 3E, according to some implementations. In some implementations, the graphene platelet 400 may be modified via chemical techniques to have one side of the graphene platelet 400 polar and the opposite site of the graphene platelet 400 nonpolar. For example, the chemical techniques may include functionalization with chemical functional groups, adsorption with chemical compounds, or a combination thereof. In some instances, the chemical compounds that are adsorbed on the surface of the graphene platelet 400 may include PAHs.

For the example of FIG. 4, the graphene platelet 400 is shown to include four graphene layers 410-440 stacked (such as vertically or substantially vertically) on top of one another and PAH 412 adsorbed at one or more adsorption sites on the graphene layer 410. In other implementations, the graphene platelet 400 may include other numbers of graphene layers and the PAH 412 may be adsorbed on another graphene layer of the graphene platelet 400. As an example, the PAH 412 may be naphthalene, acenaphthylene, acenaphthene, fluorene, phenanthrene, fluoranthene, pyrene, anthracene, benzo(a)anthracene, chrysene benzo(b)fluoranthene, benzo(k)fluoranthene, benzo(a)pyrene dibenzo(a,h)anthracene, benzo(g,h,i)perylene, indeno(1,2,3-cd)pyrene, or any combination thereof. The adsorption of the PAH 412 onto the graphene platelet 400 may affect one or more properties of the carbon fiber 110 of FIG. 1A. These properties may include (but are not limited to) larger graphitic structure in the fiber microstructure, enhanced tensile strength, and enhanced adhesion between the fiber and the binder matrix. In this way, carbon fiber composites manufactured and/or reinforced using techniques disclosed herein can absorb and/or dissipate energy and stresses associated with the applied forces, pressures, and load, and thereby improve the overall mechanical properties of the carbon fiber composite 100. Some of the improved mechanical properties are summarized below in Table 1. In some implementations, mechanical properties of the Applicant's ("LYTEN") carbon fiber composite manufactured by subject matter and techniques disclosed herein are superior to those demonstrated by the control carbon fiber composite by a different in a range approximately between 2.5% and 41.7% (inclusive).

TABLE 1

Comparison of mechanical properties of a carbon fiber composite

| TEST ID | SAMPLE ID | | |
|---|---|---|---|
| | Control | Lyten | Difference |
| Tensile Strength-0° (ASTM 3039) | | | |
| Strength (MPa) | 2242 | 2404 | 7.23% |
| Modulus (GPa) | 152 | 170 | 11.84% |
| Tensile Strength-90° (ASTM 3039) | | | |
| Strength (MPa) | 25.3 | 34.5 | 36.36% |
| Modulus (GPa) | 8 | 9.1 | 13.75% |
| Compression Strength-0° (ASTM 6641) | | | |
| Strength (MPa) | 873 | 1082 | 23.94% |
| Compression Strength-90° (ASTM 6641) | | | |
| Strength (MPa) | 121 | 144 | 19.01% |
| In-Plane Shear Strength (ASTM 3518) | | | |
| Strength (MPa) | 56 | 57.4 | 2.50% |
| Modulus (GPa) | 1.2 | 1.7 | 41.67% |
| Interlaminar Shear Strength-0° (ASTM 2344) | | | |
| Strength (MPa) | 64 | 77 | 20.31% |
| Flexural Strength (ASTM 790) | | | |
| Strength (MPa) | 1380 | 1571 | 13.84% |
| Modulus (GPa) | 139 | 158 | 13.67% |

Figure 5:
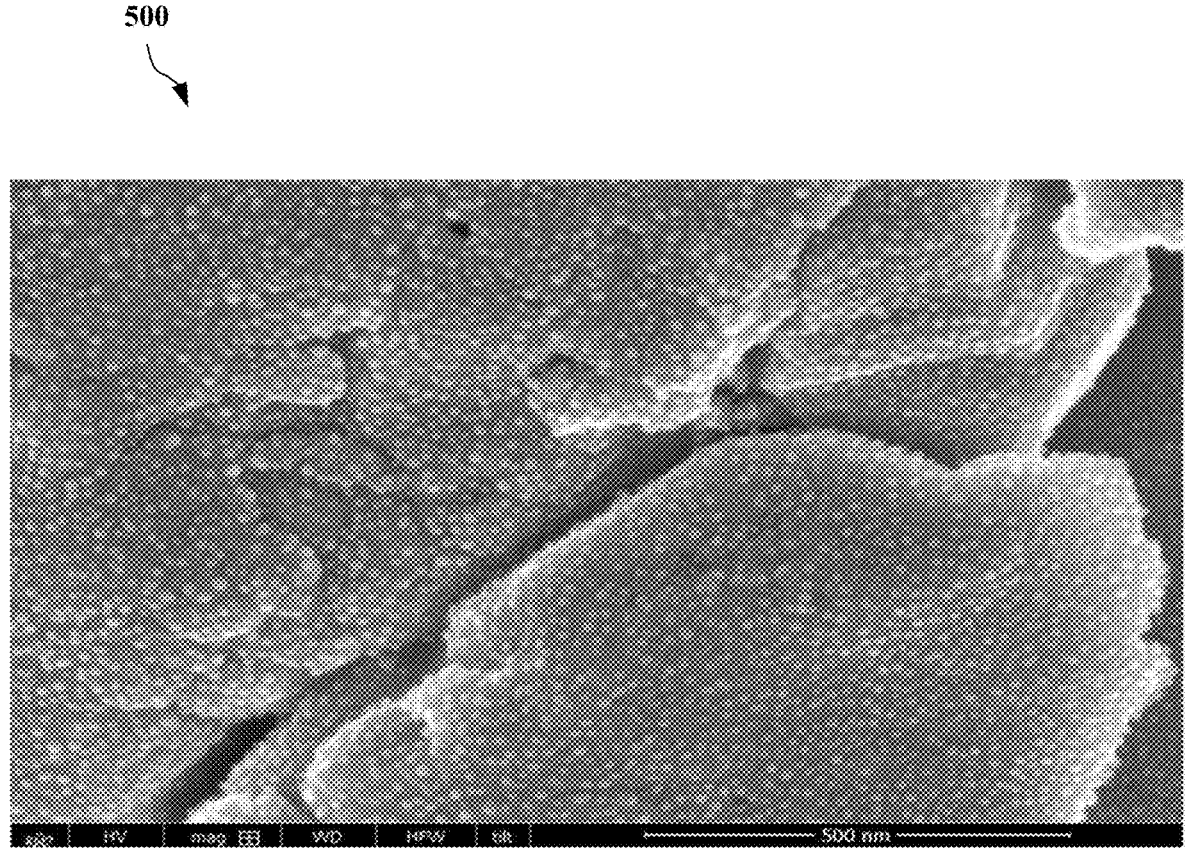
FIG. 5 is a SEM image of an illustrative polymer formulation including three-dimensional (3D) graphene, according to one embodiment.

FIG. 5 is a SEM image 500 of an illustrative polymer formulation including three-dimensional (3D) graphene, according to one embodiment. As can be seen from the various nodules appearing on the surface of the formulation, 3D graphene is integrated into the bulk of the material and the external surface thereof, providing a plurality of active sites for polymer/graphene interaction and optional functionalization of the material, e.g. via surface oxidation, nitridation, for doping of the material, for surface modification and material densification, etc. as would be understood by a person having ordinary skill in the art upon reading the present disclosure.

Figure 6:
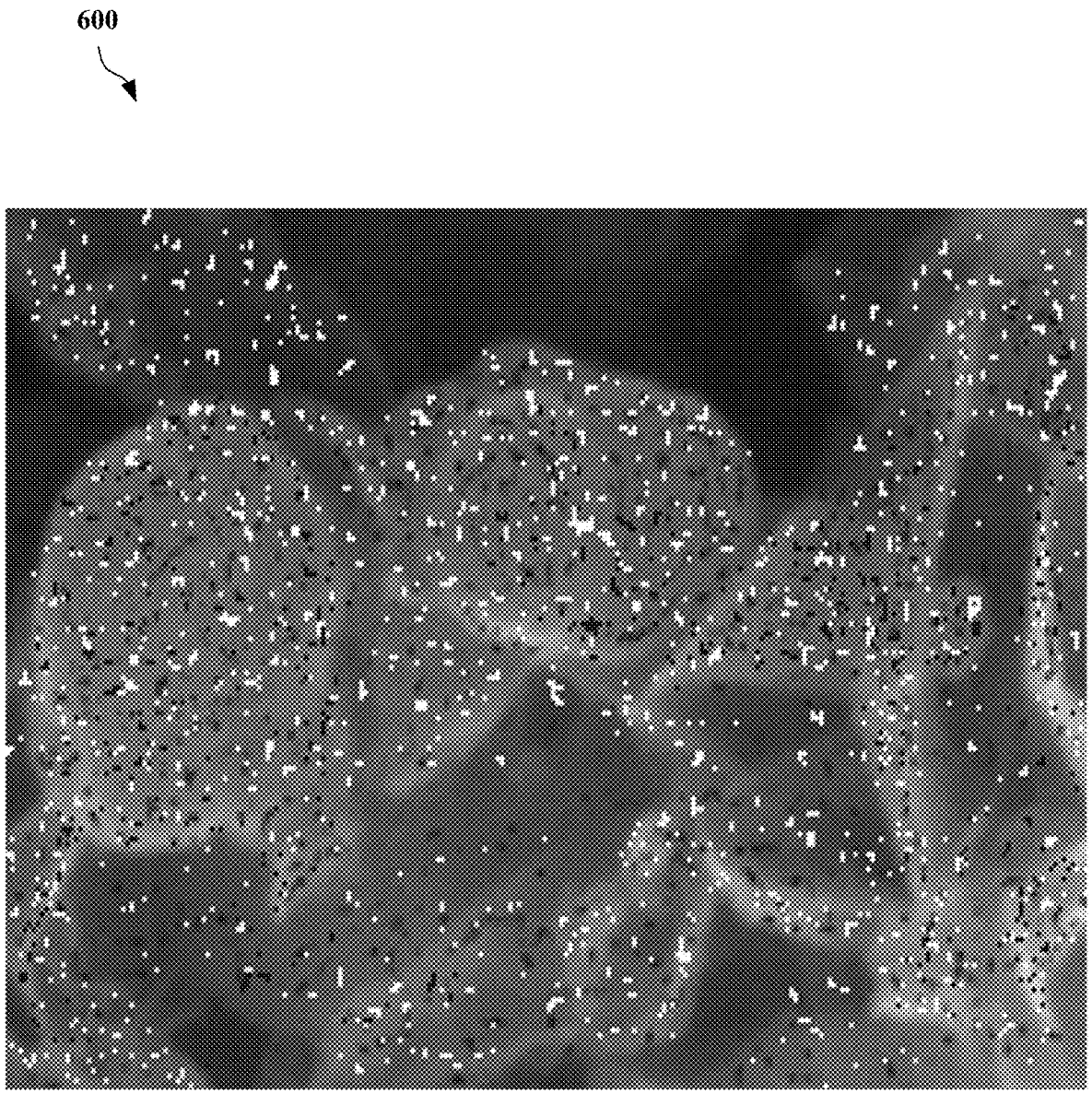
FIG. 6 is an isometric micrograph image of an interior volume of a carbon fiber having 3D graphene ligands intermeshed throughout the bulk of the fiber, according to one implementation.

FIG. 6 is a micrograph image 600 of an interior volume of a carbon fiber having 3D graphene ligands intermeshed (or, equivalently, "integrated" as described herein) throughout the bulk of the fiber, according to one implementation. As utilized herein, the term "ligand", "ligands", etc. shall be understood as referring to a substructure that extends or branches (e.g., in a substantially fractal configuration) outward from a core structure, such as a graphene platelet or carbo-based materials with or without a chemical trace. In preferred embodiments, "ligands" include or are substantially carbon-based structures, and some or all of the carbon atoms may exhibit $sp^3$ orbital hybridization. Additionally, the ligands could also exhibit a chemical trace, chemical functionalities, coupling agent, or other chemical alteration/methods. Also preferably, ligands may be characterized by a substantially elongated structure, e.g., being <10% of the diameter of the fiber or being >100% of the diameter of the fiber or somewhere in between, according to various approaches.

The intermeshing of ligands in the bulk volume of fibers provides a multitude of "anchors" by which individual fibers may be crosslinked, reinforcing composite materials made from inventive carbon fibers as disclosed herein, according to some approaches. In addition, integration of graphene platelets and/or ligands within the bulk volume of an individual fiber advantageously reinforces the structural integrity of the individual fiber, particularly with respect to compression strength and tensile strength applied in a direction substantially deviating from parallel to the longitudinal axis of the fiber. However, it shall be appreciated that in accordance with various embodiments of the presently described inventive concepts, fibers may be reinforced, e.g., by filamentous carbon-based structures as described herein, via such reinforcing structures being present within the bulk volume of the fiber, sized (or otherwise disposed) on surface(s) of the fiber, or in close proximity to the fiber, e.g. via being present in a resin or binder matrix structurally coupled to the fiber.

For instance, FIG. 6 depicts a plurality of white and black dots distributed throughout the bulk of the overall structure. The black dots indicate surface roughness, and facilitate modification of the surface, e.g., to improve mechanical adhesion through friction or other mechanical locking mechanisms. In turn, the white dots represent surface chemistry, which improves the chemical interface of surface(s) of the fiber and/or binder matrix. Examples of such improvements include functionalization with various functional groups or moieties, inclusion of coupling agents, etc. as would be understood by a person having ordinary skill in the art upon reading the present disclosure.

Further, skilled artisans will understand that, as an engineered material, three-dimensional graphene and control over the formation process allows tuning the surfaces of the material to improve bonding of various types with various compounds, providing tunable surface chemistry. Further owing to the engineered nature of the structure, three-dimensional graphene in select embodiments may impart the ability to couple with a coupling agent and bring together fibers and polymers (especially polymers that also have three-dimensional graphene included therein/sized thereon), lending improved mechanical strength to the resulting composite material.

Figure 7A:
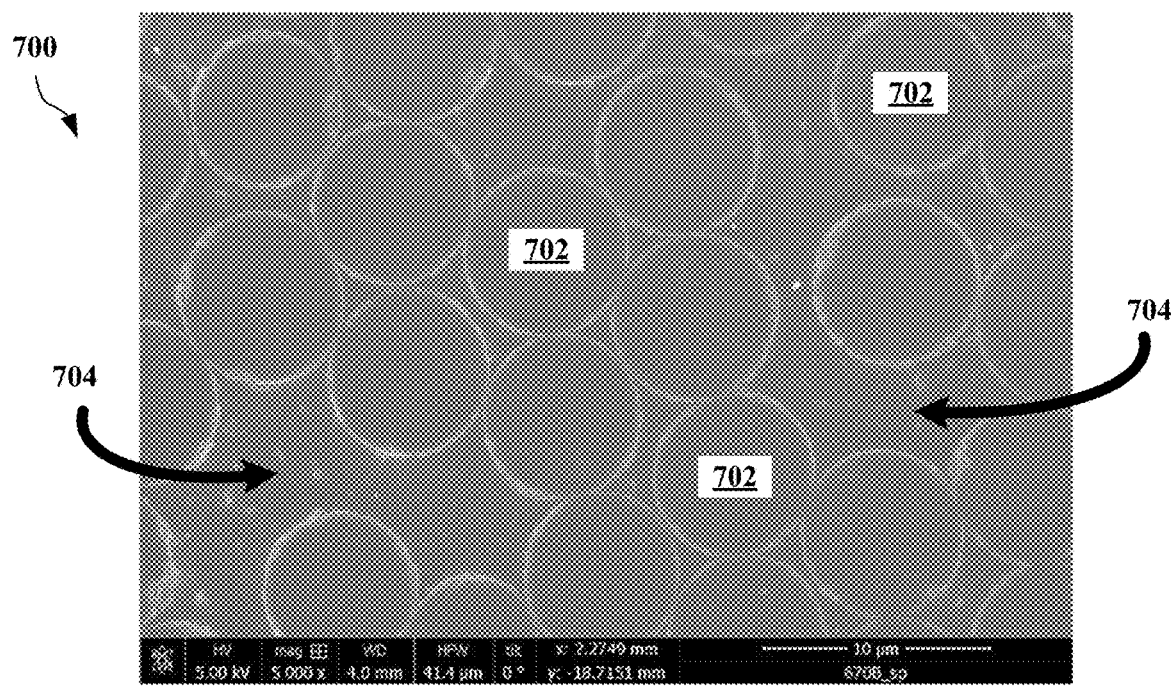
FIG. 7A is an image showing a plurality of carbon fibers intermeshed with 3D graphene from a cross-sectional view, according to an exemplary aspect. The view shown in FIG. 7A demonstrates the 3D graphene intermeshed with the structure as a whole, as well as individual fibers, and filling interstitial voids between the individual fibers, according to an exemplary implementation.

FIG. 7A is an image 700 showing a plurality of carbon fibers 702 intermeshed with 3D graphene from a cross-sectional view, according to an exemplary aspect. The view shown in FIG. 7A demonstrates the 3D graphene intermeshed with the structure as a whole, as well as with individual fibers 702, and filling interstitial spaces 704 between the individual fibers, according to an exemplary implementation.

Figure 7B:
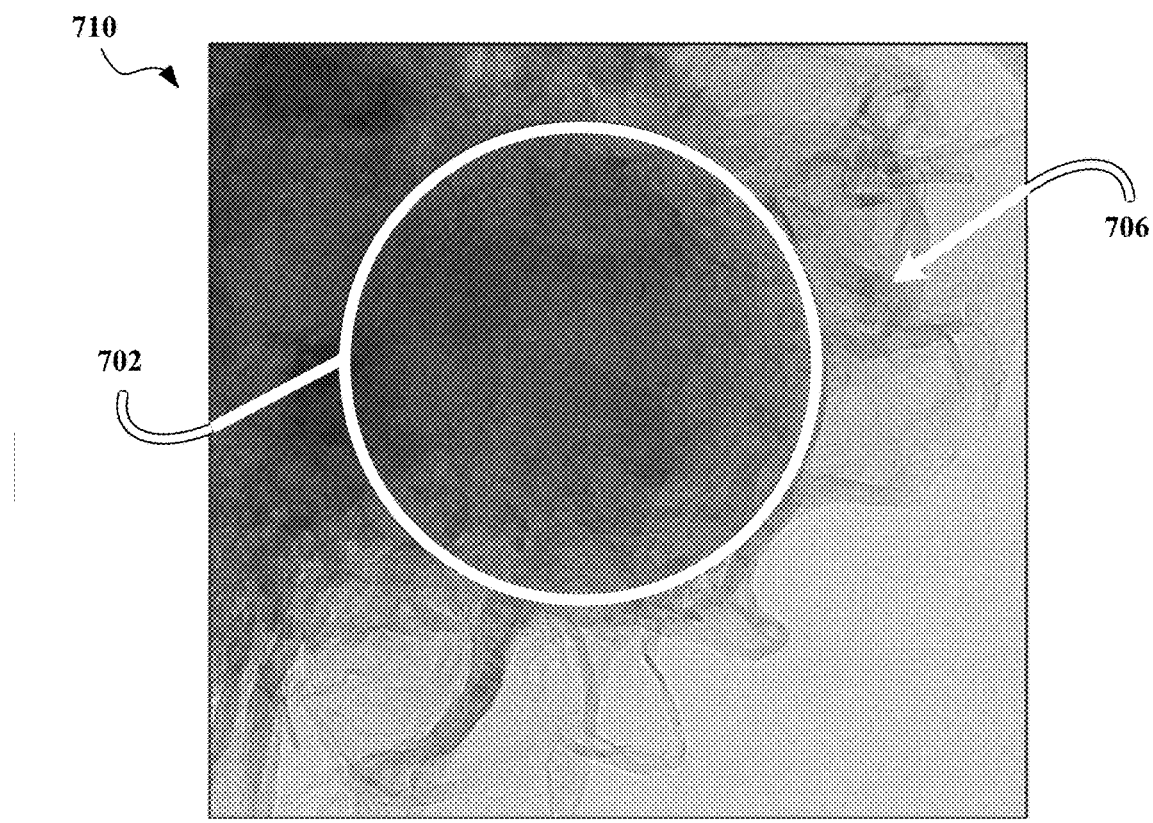
FIG. 7B shows one of the carbon fibers depicted in FIG. 7A, illustrating the 3D graphene intermeshing with both the bulk and exterior surface of the carbon fiber, according to one aspect.

FIG. 7B is an image 710 of one of the carbon fibers depicted in FIG. 7A, illustrating the 3D graphene intermeshing with both the bulk and exterior surface of the carbon fiber, according to one aspect. As can be seen from the image, ligands 706 of 3D graphene extend beyond the external surface of individual fibers within which the ligands 706 are integrated. These ligands 706 effectively "crosslink" the various fibers shown in FIG. 7A, reinforcing the multi-fiber structure as a whole. In embodiments where a binder matrix is included in the composition (e.g., occupying some or all of the volume in interstitial spaces 704 between fibers), these ligands 706 may be integrated or intermeshed with the matrix, lending still further improvements to structural integrity of the composite material.

Figure 7C:
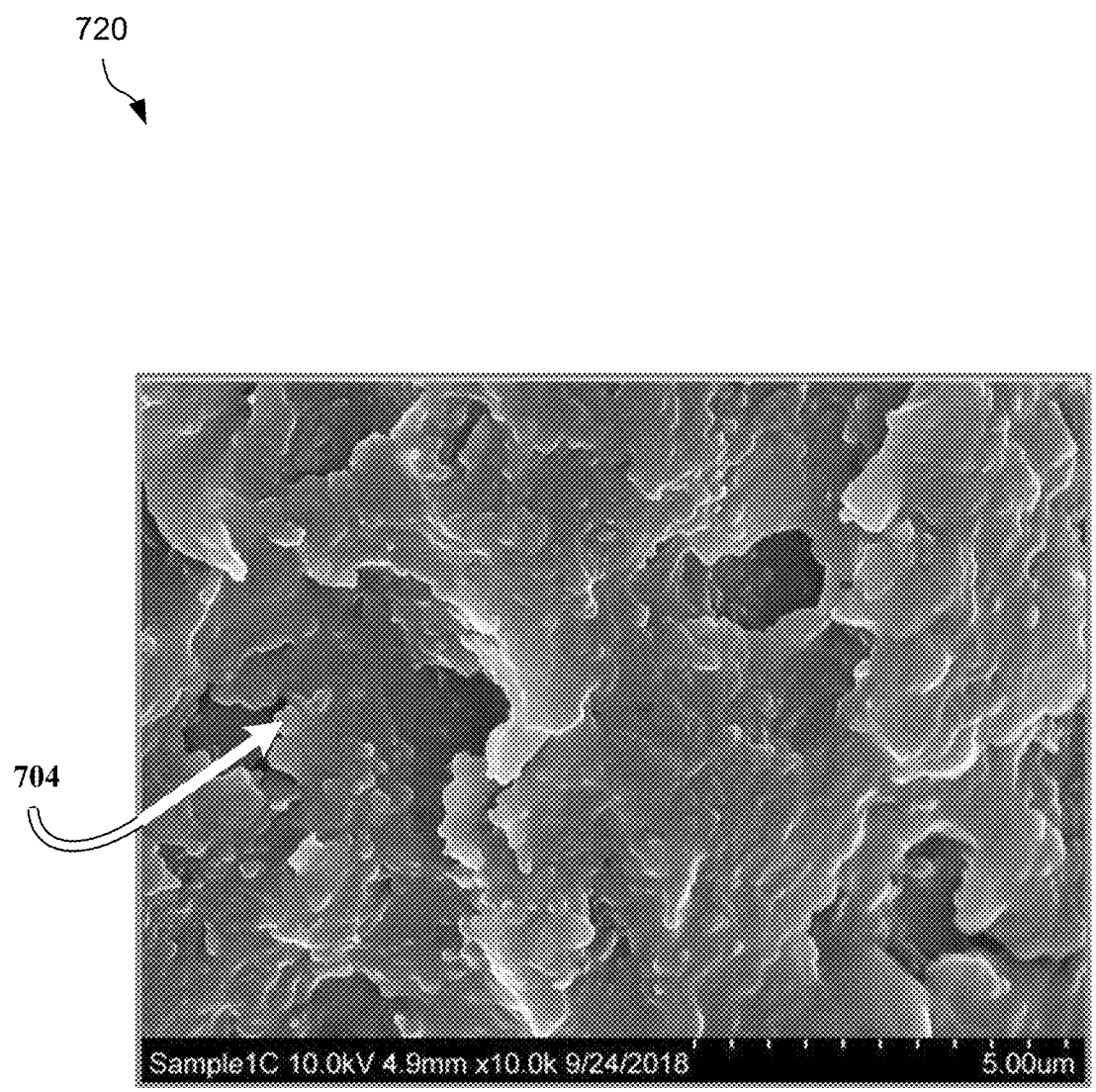
FIG. 7C is a SEM image showing the ligand structure of 3D graphene, according to one approach.

FIG. 7C is a SEM image 720 showing an exemplary ligand structure of 3D graphene, according to one approach.

FIG. 8A is a micrograph image 800 showing a conventional carbon fiber without carbon fiber filaments or particles disposed therein, from a cross-sectional view, while FIG. 8B is a micrograph image 810 showing an inventive carbon fiber having a plurality of carbon fiber filaments or particles (dark spots) disposed therein, from a cross-sectional view according to an illustrative implementation.

Figure 9A:
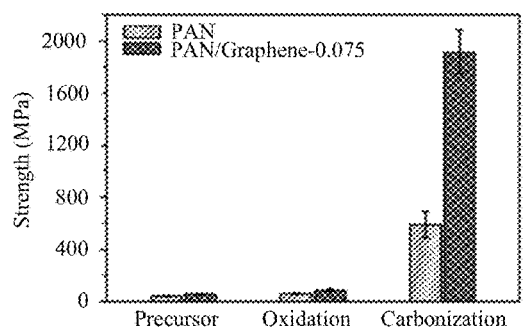
FIG. 9A is a graph comparing compressive strength of a PAN-based polymer filament with that of a PAN/graphene-0.075 composite carbon fiber at various stages of fabrication, according to one approach.

FIG. 9A is a graph comparing compressive strength of a PAN-based polymer filament with that of a PAN/graphene-0.075 composite carbon fiber containing approximately 0.075 wt % graphene, at various stages of fabrication, according to one approach. As evident from the graph, conventional PAN and the inventive PAN/graphene-0.075 materials exhibit similar compression strength both in precursor form and upon oxidation. Both PAN and the inventive PAN/graphene-0.075 materials also exhibit substantially improved compressive strength upon carbonization, as expected. However, the compressive strength of the carbonized PAN/graphene-0.075 material is nearly quadruple that of the carbonized conventional PAN-based composition. Without wishing to be bound to any particular theory, the inventors conclude the improved compressive strength is provided via presence of a network of carbon filaments, 3D graphene, or both throughout the carbon fiber and having a distribution of orientation angles, preferably including filaments and/or 3D graphene platelets oriented at an angle substantially parallel to the longitudinal axis of the carbon fiber, as well as filaments and/or 3D graphene platelets oriented at angles substantially deviating from parallel to the longitudinal axis of the carbon fiber.

Figure 9B:
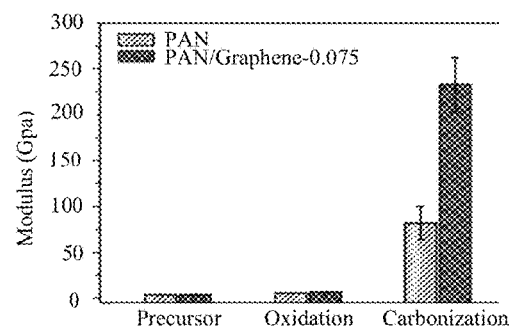
FIG. 9B is a graph comparing Young's modulus of a PAN-based polymer filament with that of a PAN/graphene-0.075 composite carbon fiber at various stages of fabrication, according to one approach.

FIG. 9B is a graph comparing Young's modulus of a PAN-based polymer filament with that of a PAN/graphene-0.075 composite carbon fiber at various stages of fabrication, according to one approach. In like manner as compressive strength demonstrated in FIG. 9A, the modulus of precursor and oxidized PAN-based polymer filaments and PAN/graphene-0.075 composite fibers is relatively low, and similar to each other. Again, similar to the compressive strength, the modulus of both materials increases significantly upon carbonization, although the carbonized PAN/graphene-0.075 composite carbon fiber exhibits a modulus approximately thrice that of carbonized PAN-based polymer filaments. A similar mechanism as explained above regarding the improved compressive strength is believed to be the source of improved modulus in the inventive carbon fiber composite materials described herein.

Figure 9C:
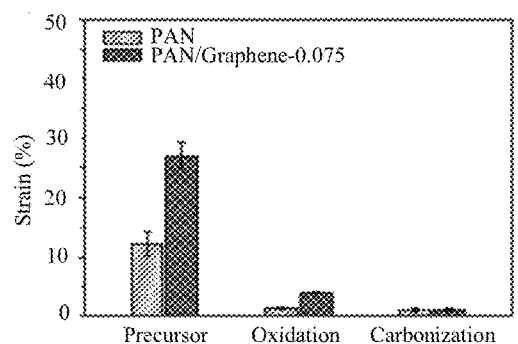
FIG. 9C is a graph comparing strain of a PAN-based polymer filament with that of a PAN/graphene-0.075 composite carbon fiber at various stages of fabrication, according to one approach.

FIG. 9C is a graph comparing strain of a PAN-based polymer filament with that of a PAN/graphene-0.075 composite carbon fiber at various stages of fabrication, according to one approach. As expected, precursor materials of both compositions exhibit the highest strain, although strain observed in the PAN/graphene-0.075 precursor material is nearly 2.5 times the magnitude of strain in the PAN-based precursor material. Upon oxidation, strain is effectively eliminated in the PAN-based polymer filament, and significantly reduced in the PAN/graphene-0.075 material, although still approximately 2.5 times as much as in the oxidized PAN-based polymer filament. Finally, upon carbonization, both materials exhibit substantially negligible strain.

Figure 10A:
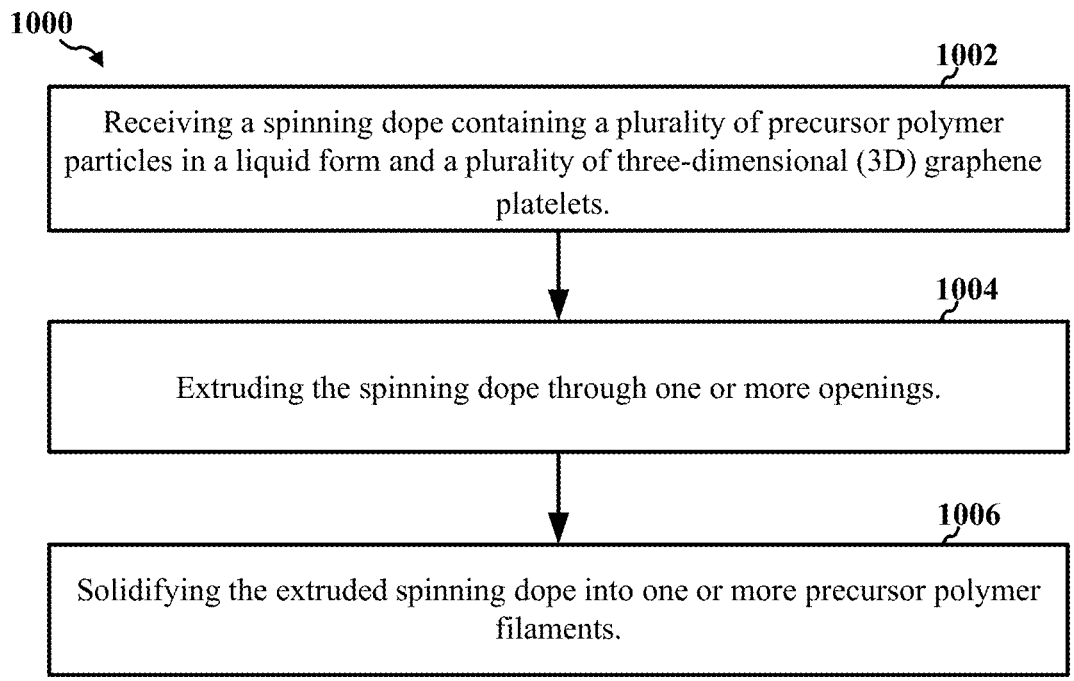
FIG. 10A shows a flowchart depicting an example operation for manufacturing a carbon fiber filament, according to some implementations.

FIG. 10A shows a flowchart depicting an example operation for manufacturing a carbon fiber filament, according to some implementations. In various implementations, the operation 1000 may be performed via wet spinning, electrospinning, melt spinning, or any combination thereof. In other implementations, the operation 1000 may be performed via another suitable chemical processing techniques. In some implementations, the plurality of polymer particles may be dissolved in a liquid solvent to result in the liquid form. In some other implementations, the plurality of polymer particles may be in a melted state, and the melted state is the liquid form. In various implementations, the weight percentage of the plurality of graphene platelets being added may be less than 1 wt %.

In some implementations, each of a plurality of graphene platelets may contain a single-layer graphene (SLG), a few-layer graphene (FLG), a multi-layer graphene (MLG), or any combination thereof. In various implementations, the plurality of graphene platelets may be modified via chemical techniques so that each graphene platelet may have one side polar and the opposite site nonpolar. For example, the chemical techniques may include functionalization with chemical functional groups, adsorption with chemical compounds, or a combination thereof. In some instances, each graphene platelet may have PAH adsorbed at one or more adsorption sites on a first side of the graphene platelet. As an example, the PAH may be naphthalene, acenaphthylene, acenaphthene, fluorene, phenanthrene, fluoranthene, pyrene, anthracene, benzo(a)anthracene, chrysene benzo(b)fluoranthene, benzo(k)fluoranthene, benzo(a)pyrene dibenzo(a,h)anthracene, benzo(g,h,i)perylene, indeno(1,2,3-cd)pyrene, or any combination thereof.

In some aspects, the operation 1000 begins at block 1002 with receiving a spinning dope containing a plurality of polymer particles in a liquid form and a plurality of graphene platelets. The operation 1000 continues at block 1004 with extruding the spinning dope through one or more openings. In some instances, the one or more openings may be a spinneret with multiple holes. In some other instances, the one or more openings may be a tip of a needle or a syringe. The operation 1000 continues at block 1006 with solidifying the extruded spinning dope into one or more polymer filaments. In some implementations, the extruded spinning dope may be immersed in a liquid coagulation bath for solidification. In some other implementations, the extruded spinning dope may be subject to cooling, solvent evaporation, or other suitable treatment for solidification.

Figure 10B:
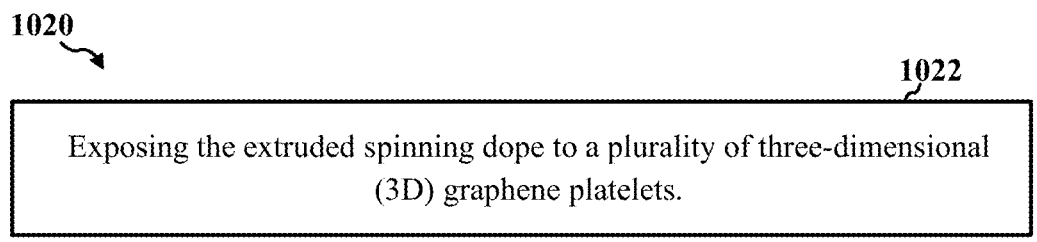
FIG. 10B shows a flowchart depicting an example operation for manufacturing a carbon fiber filament, according to some implementations.

FIG. 10B shows a flowchart depicting an example operation for manufacturing a carbon fiber filament, according to some implementations. In various implementations, the operation 1020 may be performed concurrently with solidifying the extruded spinning dope into one or more polymer filaments in block 1006 of FIG. 10A. In some aspects, the operation 1020 begins at block 1022 with exposing the extruded spinning dope to a plurality of graphene platelets. In some implementations, each of the graphene platelets may contain a single-layer graphene (SLG), a few-layer graphene (FLG), a multi-layer graphene (MLG), or any combination thereof. In various implementations, the plurality of graphene platelets may be modified via chemical techniques so that each graphene platelet may have one side polar and the opposite site nonpolar. For example, the chemical techniques may include functionalization with chemical functional groups, adsorption with chemical compounds, or a combination thereof. In some instances, each graphene platelet may have PAH adsorbed at one or more adsorption sites on a first side of the graphene platelet. As an example, the PAH may be naphthalene, acenaphthylene, acenaphthene, fluorene, phenanthrene, fluoranthene, pyrene, anthracene, benzo(a)anthracene, chrysene benzo(b)fluoranthene, benzo(k)fluoranthene, benzo(a)pyrene dibenzo(a,h)anthracene, benzo(g,h,i)perylene, indeno(1,2,3-cd)pyrene, or any combination thereof.

Figure 10C:
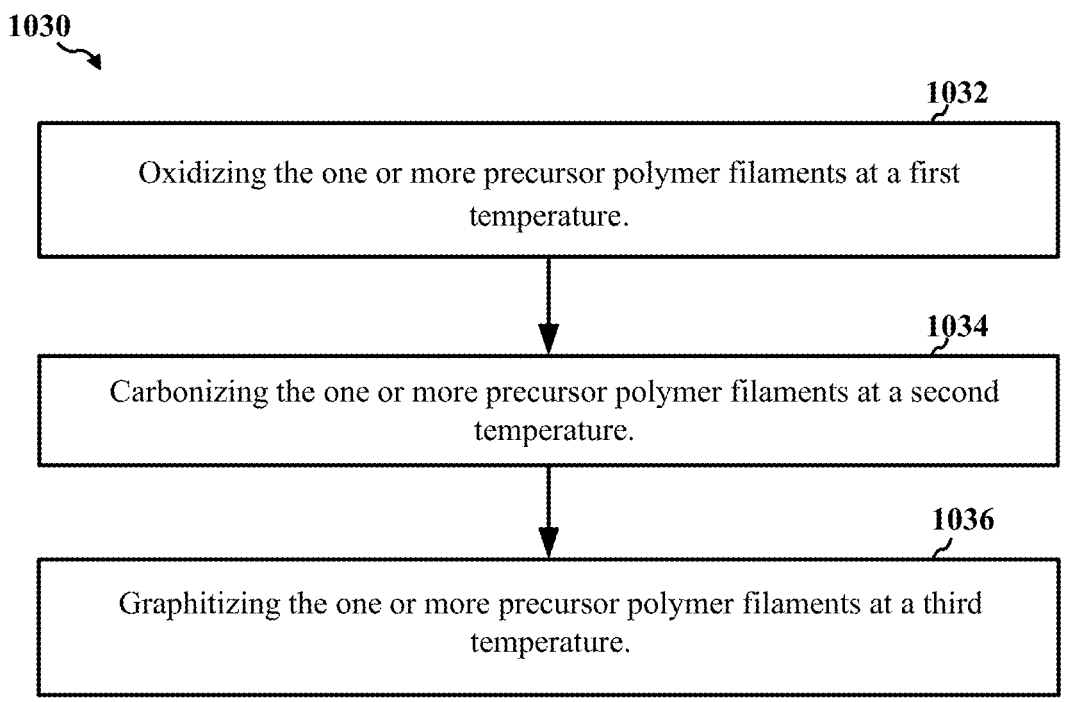
FIG. 10C shows a flowchart depicting an example operation for manufacturing a carbon fiber filament, according to some implementations.

FIG. 10C shows a flowchart depicting an example operation for manufacturing a carbon fiber filament, according to some implementations. In various implementations, the operation 1030 may be performed after solidifying the extruded spinning dope into one or more polymer filaments in block 1006 of FIG. 10A. In some aspects, the operation 1030 begins at block 1032 with oxidizing the one or more polymer filaments at a first temperature. In various implementations, the operation 1030 may be performed in a thermal reactor or any other suitable reacting chamber with applied heat. The operation 1030 continues at block 1034 with carbonizing the one or more polymer filaments at a second temperature. The operation 1030 continues at block 1036 with graphitizing the one or more polymer filaments at a third temperature. In various implementations, the third temperature is higher than the second temperature, and the second temperature is higher than the first temperature.

Figure 11:
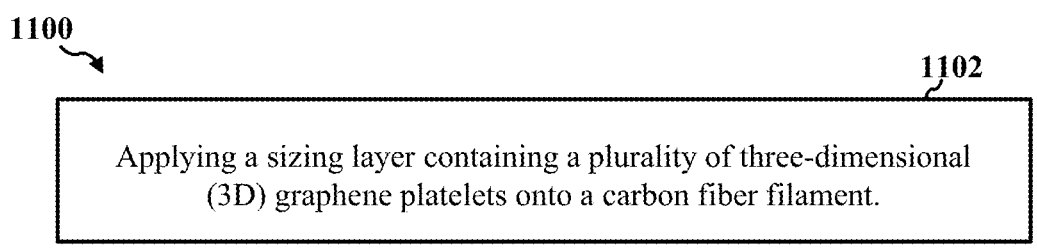
FIG. 11 shows a flowchart depicting another example operation for manufacturing a carbon fiber filament, according to some other implementations.

FIG. 11 shows a flowchart depicting another example operation for manufacturing a carbon fiber filament, according to some implementations. In some aspects, the operation 1100 begins at block 1102 with applying a sizing layer containing a plurality of graphene platelets onto a carbon fiber filament. In some instances, the carbon fiber filament may be produced by techniques and processes disclosed herein such as wet spinning, electrospinning, melt spinning, or any combination thereof. In other instances, the carbon fiber may be a commercially available product from a commercial manufacturer. In some implementations, each of the graphene platelets may contain a single-layer graphene (SLG), a few-layer graphene (FLG), a multi-layer graphene (MLG), or any combination thereof. In various implementations, the plurality of graphene platelets may be modified via chemical techniques so that each graphene platelet may have one side polar and the opposite site nonpolar. For example, the chemical techniques may include functionalization with chemical functional groups, adsorption with chemical compounds, or a combination thereof. In some instances, each graphene platelet may have PAH adsorbed at one or more adsorption sites on a first side of the graphene platelet. As an example, the PAH may be naphthalene, acenaphthylene, acenaphthene, fluorene, phenanthrene, fluoranthene, pyrene, anthracene, benzo(a)anthracene, chrysene benzo(b)fluoranthene, benzo(k)fluoranthene, benzo(a)pyrene dibenzo(a,h)anthracene, benzo(g,h,i)perylene, indeno(1,2,3-cd)pyrene, or any combination thereof. In various implementations, the weight percentage of the plurality of graphene platelets being added may be less than 1 wt %. In this way, the plurality of graphene platelets may enhance "crosslinking" between the carbon fiber filaments and a surrounding binder matrix when a stress associated with a load is applied. Such enhanced "crosslinking" may prevent adhesion failure in an interphase zone between the carbon fiber filaments and the binder matrix, and thereby reinforce the carbon fiber composite composed of the carbon fiber filament and the binder matrix.

In various implementations, a plurality of carbon fiber filaments may be physically bundled together to form one or more carbon fibers as shown in FIG. 1A. By having a plurality of graphene platelets reinforcing the internal microstructure of each filament and improving adhesion between each filament and the binder matrix, mechanical properties of the resulted carbon fiber composite as shown in FIG. 1A may be improved. The improved mechanical properties may include (but are not limited to) tensile strength, tensile modulus, and compression strength in the direction parallel to the carbon fiber axis, tensile strength, tensile modulus, and compression strength in the direction orthogonal to the carbon fiber axis, in-plain shear strength and modulus, interlaminar shear strength, and flexural strength and modulus.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

In accordance with one implementation, a composition of matter includes: a carbon fiber having a plurality of carbon fiber filaments disposed therein, where at least some of the plurality of carbon fiber filaments are each independently characterized by a longitudinal axis oriented at an angle substantially deviating from parallel to a longitudinal axis of the carbon fiber. Optionally, longitudinal axes of at least some of the plurality of carbon fiber filaments are characterized by a substantially random distribution of orientation angles each independently deviating from parallel to the longitudinal axis of the carbon fiber. Similarly, longitudinal axes of other of the plurality of carbon fiber filaments may be aligned substantially in parallel with the longitudinal axis of the carbon fiber. At least some of the carbon fiber filaments may be discontinuous, while other of the carbon fiber filaments may be continuous. For instance, the carbon fiber filaments may be characterized by an aspect ratio in a range from about 100:1 to about 1000:1. Moreover, at least some of the carbon fiber filaments may independently comprise one or more graphene platelets. In such approaches, at least some of the one or more graphene platelets may comprise three-dimensional (3D) graphene, and/or at least some at least some carbon atoms of the 3D graphene may be characterized by $sp^3$ orbital hybridization. The plurality of graphene platelets may each independently comprise each a single-layer graphene (SLG), a few-layer graphene (FLG), a multi-layer graphene (MLG), or any combination thereof. At least some of the graphene platelets may comprise one or more polycyclic aromatic hydrocarbons (PAHs) adsorbed to one or more adsorption sites on one or more surfaces of the graphene platelets. Optionally, planes of orientation of at least some of the graphene platelets may each be independently oriented at an angle substantially deviating from parallel to a longitudinal axis of the carbon fiber. The 3D graphene may, in various approaches, be present in an amount ranging from less than one weight percent of a total weight of the carbon fiber to about one hundred weight percent of the total weight of the carbon fiber. Further, at least some of the plurality of carbon fiber filaments may be sized on one or more exterior surfaces of the carbon fiber. The composition of matter may be provided in the form of a plurality of the carbon fibers substantially aligned in parallel along the longitudinal axes thereof, where at least some of the carbon fiber filaments preferably crosslink some or all of the plurality of carbon fibers. Similarly, the composition of matter may include a binder matrix having a second plurality of carbon fiber filaments disposed therein, where at least some of the second plurality of carbon fiber filaments preferably crosslink some or all of the plurality of carbon fibers. Moreover, the composition may substantially exclude oxygen.

According to another implementation, a composition of matter includes: a carbon fiber having a plurality of graphene platelets disposed therein, where at least some of the graphene platelets comprise three-dimensional (3D) graphene. The 3D graphene may, in various approaches, be present in an amount ranging from less than one weight percent of a total weight of the carbon fiber to about one hundred weight percent of the total weight of the carbon fiber. Optionally, at least some carbon atoms of the 3D graphene are characterized by $sp^3$ orbital hybridization. Preferably, the 3D graphene comprises a plurality of ligands integrated into: a bulk of the carbon fiber; an exterior surface of the carbon fiber; or both the bulk and the exterior surface of the carbon fiber. Planes of orientation of at least some of the graphene platelets may each be independently oriented at an angle substantially deviating from parallel to a longitudinal axis of the carbon fiber. The plurality of graphene platelets may each independently comprise each a single-layer graphene (SLG), a few-layer graphene (FLG), a multi-layer graphene (MLG), or any combination thereof. At least some of the graphene platelets may comprise one or more polycyclic aromatic hydrocarbons (PAHs) adsorbed to one or more adsorption sites on one or more surfaces of the graphene platelets. Moreover, at least some of the plurality of graphene platelets may be sized on one or more external surfaces of the carbon fiber. The composition of matter may be provided in the form of a plurality of the carbon fibers substantially aligned in parallel along the longitudinal axes thereof; where at least some of the graphene platelets preferably crosslink some or all of the plurality of carbon fibers. Additionally or alternatively, the carbon fiber may have a plurality of carbon fiber filaments disposed therein, where at least some of the plurality of carbon fiber filaments are each independently characterized by a longitudinal axis oriented at an angle substantially deviating from parallel to a longitudinal axis of the carbon fiber. Optionally, longitudinal axes of at least some of the plurality of carbon fiber filaments are characterized by a substantially random distribution of orientation angles each independently deviating from parallel to the longitudinal axis of the carbon fiber. Similarly, longitudinal axes of other of the plurality of carbon fiber filaments may be aligned substantially in parallel with the longitudinal axis of the carbon fiber. At least some of the carbon fiber filaments may be discontinuous, while other of the carbon fiber filaments may be continuous. For instance, the carbon fiber filaments may be characterized by an aspect ratio in a range from about 100:1 to about 1000:1. Further, at least some of the plurality of carbon fiber filaments may be sized on one or more exterior surfaces of the carbon fiber. The composition of matter may include an optional binder matrix having a second plurality of carbon fiber filaments disposed therein, where at least some of the second plurality of carbon fiber filaments preferably crosslink some or all of the plurality of carbon fibers. Moreover, the composition may substantially exclude oxygen.

According to yet another implementation, a composition of matter includes: a carbon fiber having a plurality of carbon fiber filaments sized on one or more external surfaces thereof, where the carbon fiber filaments are characterized by either: comprising graphene platelets; having a longitudinal axis of some or all of the carbon fiber filaments oriented at an angle substantially deviating from parallel to a longitudinal axis of the carbon fiber; or both comprising the graphene platelets and having the longitudinal axis of some or all of the carbon fiber filaments oriented at the angle substantially deviating from parallel to the longitudinal axis of the carbon fiber. At least some of the graphene platelets may comprise one or more polycyclic aromatic hydrocarbons (PAHs) adsorbed to one or more adsorption sites on one or more surfaces of the graphene platelets. Preferably, at least some of the graphene platelets comprise three-dimensional (3D) graphene, and at least some carbon atoms of the 3D graphene are characterized by $sp^3$ orbital hybridization. The 3D graphene may, in various approaches, be present in an amount ranging from less than one weight percent of a total weight of the carbon fiber to about one hundred weight percent of the total weight of the carbon fiber. Preferably, the 3D graphene comprises a plurality of ligands integrated into: a bulk of the carbon fiber; an exterior surface of the carbon fiber; or both the bulk and the exterior surface of the carbon fiber. Planes of orientation of at least some of the graphene platelets may each be independently oriented at an angle substantially deviating from parallel to a longitudinal axis of the carbon fiber. The plurality of graphene platelets may each independently comprise each a single-layer graphene (SLG), a few-layer graphene (FLG), a multi-layer graphene (MLG), or any combination thereof. At least some of the graphene platelets may comprise one or more polycyclic aromatic hydrocarbons (PAHs) adsorbed to one or more adsorption sites on one or more surfaces of the graphene platelets. Moreover, at least some of the plurality of graphene platelets may be sized on one or more external surfaces of the carbon fiber. The composition of matter may be provided in the form of a plurality of the carbon fibers substantially aligned in parallel along the longitudinal axes thereof; where at least some of the carbon fiber filaments (which, again, may comprise graphene platelets) preferably crosslink some or all of the plurality of carbon fibers. Additionally or alternatively, the carbon fiber may have a plurality of carbon fiber filaments disposed therein, where at least some of the plurality of carbon fiber filaments are each independently characterized by a longitudinal axis oriented at an angle substantially deviating from parallel to a longitudinal axis of the carbon fiber. Optionally, longitudinal axes of at least some of the plurality of carbon fiber filaments are characterized by a substantially random distribution of orientation angles each independently deviating from parallel to the longitudinal axis of the carbon fiber. Similarly, longitudinal axes of other of the plurality of carbon fiber filaments may be aligned substantially in parallel with the longitudinal axis of the carbon fiber. At least some of the carbon fiber filaments may be discontinuous, while other of the carbon fiber filaments may be continuous. For instance, the carbon fiber filaments may be characterized by an aspect ratio in a range from about 100:1 to about 1000:1. Further, at least some of the plurality of carbon fiber filaments may be sized on one or more exterior surfaces of the carbon fiber. The composition of matter may include an optional binder matrix having a second plurality of carbon fiber filaments disposed therein, where at least some of the second plurality of carbon fiber filaments preferably crosslink some or all of the plurality of carbon fibers. Moreover, the composition may substantially exclude oxygen.

According to still yet another implementation, a composition of matter includes: a carbon fiber; and a binder matrix, wherein the binder matrix is structurally coupled to the carbon fiber via either: a plurality of carbon fiber filaments in the binder matrix; a plurality of graphene platelets in the binder matrix; or both the plurality of carbon fiber filaments in the binder matrix and the plurality of graphene platelets in the binder matrix. Preferably, the plurality of carbon fiber filaments in the binder matrix and/or the plurality of graphene platelets in the binder matrix are structurally coupled to the carbon fiber via crosslinking the binder matrix and the carbon fiber. The carbon fiber may comprise a second plurality of carbon fiber filaments disposed therein. In various approaches, at least some of the plurality of carbon fiber filaments and/or the second plurality of carbon fiber filaments are each independently characterized by a longitudinal axis oriented at an angle substantially deviating from parallel to a longitudinal axis of the carbon fiber. Optionally, longitudinal axes of at least some of the plurality of carbon fiber filaments and/or the second plurality of carbon fiber filaments are characterized by a substantially random distribution of orientation angles each independently deviating from parallel to the longitudinal axis of the carbon fiber. Similarly, longitudinal axes of other of the plurality of carbon fiber filaments and/or the second plurality of carbon fiber filaments may be aligned substantially in parallel with the longitudinal axis of the carbon fiber. At least some of the carbon fiber filaments and/or the second carbon fiber filaments may be discontinuous, while other of the carbon fiber filaments and/or the second carbon fiber filaments may be continuous. For instance, the carbon fiber filaments and/or the second carbon fiber filaments may be characterized by an aspect ratio in a range from about 100:1 to about 1000:1. Moreover, at least some of the carbon fiber filaments and/or the second carbon fiber filaments may independently comprise one or more graphene platelets. In such approaches, at least some of the one or more graphene platelets may comprise three-dimensional (3D) graphene, and/or at least some at least some carbon atoms of the 3D graphene may be characterized by $sp^3$ orbital hybridization. The plurality of graphene platelets may each independently comprise each a single-layer graphene (SLG), a few-layer graphene (FLG), a multi-layer graphene (MLG), or any combination thereof. At least some of the graphene platelets may comprise one or more polycyclic aromatic hydrocarbons (PAHs) adsorbed to one or more adsorption sites on one or more surfaces of the graphene platelets. Optionally, planes of orientation of at least some of the graphene platelets may each be independently oriented at an angle substantially deviating from parallel to a longitudinal axis of the carbon fiber. The 3D graphene may, in various approaches, be present in an amount ranging from less than one weight percent of a total weight of the carbon fiber to about one hundred weight percent of the total weight of the carbon fiber. Further, at least some of the plurality of carbon fiber filaments, the second plurality of carbon fiber filaments, and/or the graphene platelets may be sized on one or more exterior surfaces of the carbon fiber. The composition of matter may be provided in the form of a plurality of the carbon fibers substantially aligned in parallel along the longitudinal axes thereof, where at least some of the carbon fiber filaments and/or the second carbon fiber filaments preferably crosslink some or all of the plurality of carbon fibers. Additionally or alternatively, graphene platelets in the binder matrix and/or the carbon fiber(s) may crosslink the plurality of carbon fibers. Moreover, the composition may substantially exclude oxygen.

Moreover, one or more of the system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Similarly, a phrase referring to "at least one of", "one or more of", "some or all of", or equivalent references to a list of items refers to any combination of those items, including single members. As an example, "at least one of: a, b, or c" is intended to cover: a, b, c, a-b, a-c, b-c, and a-b-c. The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

Moreover, the term "about" as utilized herein, particularly with reference to numerical ranges, shall be understood as including the recited value, and a ±10% margin thereof. For instance, "about 1.0" shall be understood as including values in the range from 0.9 to 1.1, inclusively. Similarly, "about 500" shall be understood as including values in the range from 450 to 550. Skilled artisans will thus be distinctly aware of the full range included in any recitation of numerical values herein modified by the term "about" according to various approaches.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein. Similarly, various features described hereinabove with respect to different implementations, embodiments, aspects, etc. of the inventive concepts presently disclosed may be combined in any suitable manner that would be appreciated by a person having ordinary skill in the art and apprised of the contents of the application. Individual features are thus to be understood as "modular", and capable of being arranged, configured, included, etc. in any suitable manner unless expressly disclaimed herein, or understood as incompatible based on knowledge available in the art as of the present application's priority date.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:
1. A composition of matter, comprising:
   a carbon fiber; and
   a binder matrix, wherein the binder matrix is structurally coupled to the carbon fiber via either:
      a plurality of carbon fiber filaments in the binder matrix;
      a plurality of graphene platelets in the binder matrix; or
      both the plurality of carbon fiber filaments in the binder matrix and the plurality of graphene platelets in the binder matrix.
2. The composition of matter as recited in claim 1, wherein the carbon fiber comprises a second plurality of carbon fiber filaments disposed therein, wherein at least some of the plurality of carbon fiber filaments are each independently characterized by a longitudinal axis oriented at an angle substantially deviating from parallel to a longitudinal axis of the carbon fiber.
3. The composition of matter as recited in claim 1, wherein the carbon fiber comprises a second plurality of carbon fiber filaments sized on one or more exterior surfaces of the carbon fiber.
4. The composition of matter as recited in claim 1, comprising the plurality of graphene platelets, wherein at least some of the graphene platelets independently comprise three-dimensional (3D) graphene.
5. The composition of matter as recited in claim 4, wherein at least some carbon atoms of the 3D graphene are characterized by $sp^3$ orbital hybridization.
6. The composition of matter as recited in claim 4, wherein the 3D graphene comprises a plurality of ligands integrated into:
   a bulk of the carbon fiber;
   an exterior surface of the carbon fiber;
   the binder matrix; or
   combinations thereof.
7. The composition of matter as recited in claim 1, comprising the plurality of graphene platelets, wherein at least some of the graphene platelets comprise one or more polycyclic aromatic hydrocarbons (PAHs) adsorbed to one or more adsorption sites on one or more surfaces of the graphene platelets.
8. The composition of matter as recited in claim 7, wherein the one or more PAHs are selected from the group consisting of: naphthalene, acenaphthylene, acenaphthene, fluorene, phenanthrene, fluoranthene, pyrene, anthracene, benzo(a)anthracene, chrysene benzo(b)fluoranthene, benzo

(k)fluoranthene, benzo(a)pyrene dibenzo(a,h)anthracene, benzo(g,h,i)perylene, indeno(1,2,3-cd)pyrene, or any combination thereof.

9. The composition of matter as recited in claim 1, comprising the plurality of graphene platelets, wherein the graphene platelets comprise: single-layer graphene (SLG), few-layer graphene (FLG), multi-layer graphene (MLG), or any combination thereof.

10. The composition of matter as recited in claim 1, comprising the plurality of graphene platelets, wherein at least some of the graphene platelets are functionalized on one or more surfaces thereof.

11. The composition of matter as recited in claim 1, comprising the plurality of graphene platelets, wherein at least some of the graphene platelets comprise one or more hydrophobic surfaces and one or more hydrophilic surfaces.

12. The composition of matter as recited in claim 1, comprising the plurality of graphene platelets, wherein at least some of the graphene platelets comprise one or more polar surfaces and one or more nonpolar surfaces.

13. The composition of matter as recited in claim 1, comprising a plurality of the carbon fibers.

14. The composition of matter as recited in claim 13, wherein the plurality of carbon fibers are substantially aligned in parallel along longitudinal axes thereof.

15. The composition of matter as recited in claim 13, comprising the plurality of carbon fiber filaments, wherein at least some of the carbon fiber filaments crosslink some or all of the plurality of carbon fibers.

16. The composition of matter as recited in claim 13, comprising the plurality of graphene platelets, wherein at least some of the graphene platelets crosslink some or all of the plurality of carbon fibers.

17. The composition of matter as recited in claim 13, wherein the plurality of carbon fibers are woven into a fabric.

18. The composition of matter as recited in claim 13, wherein the plurality of carbon fibers comprise at least about 50 wt % of the composition.

19. The composition of matter as recited in claim 13, comprising the plurality of graphene platelets, wherein at least some of the graphene platelets crosslink the plurality of carbon fibers.

20. The composition of matter as recited in claim 1, wherein the carbon fiber and the binder matrix are formed into a composite carbon fiber reinforced polymer (CFRP).

21. The composition of matter as recited in claim 1, wherein the carbon fiber comprises one or more materials selected from the group consisting of: pitch, rayon, polyacrylonitrile (PAN), or any combination thereof.

22. The composition of matter as recited in claim 1, wherein the binder matrix comprises one or more materials selected from the group consisting of: a thermosetting polymer, a thermoplastic polymer, a metal, a ceramic, a resin, or any combination thereof.

23. The composition of matter as recited in claim 22, wherein the resin comprises an epoxy resin, a polyester resin, a vinyl ester resin, a nylon resin, or any combination thereof.

* * * * *